United States Patent
Gschwind et al.

(10) Patent No.: US 9,740,491 B2
(45) Date of Patent: *Aug. 22, 2017

(54) INSTRUCTION GROUP FORMATION TECHNIQUES FOR DECODE-TIME INSTRUCTION OPTIMIZATION BASED ON FEEDBACK

(71) Applicant: INTERNATIONAL BUSINESS MACHINES CORPORATION, Armonk, NY (US)

(72) Inventors: Michael K. Gschwind, Westchester, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 94 days.

This patent is subject to a terminal disclaimer.

(21) Appl. No.: 14/734,825

(22) Filed: Jun. 9, 2015

(65) Prior Publication Data
US 2016/0139926 A1     May 19, 2016

Related U.S. Application Data

(63) Continuation of application No. 14/543,533, filed on Nov. 17, 2014.

(51) Int. Cl.
*G06F 9/30*     (2006.01)
*G06F 9/38*     (2006.01)

(52) U.S. Cl.
CPC ......... *G06F 9/30145* (2013.01); *G06F 9/382* (2013.01); *G06F 9/3853* (2013.01)

(58) Field of Classification Search
None
See application file for complete search history.

(56) References Cited

U.S. PATENT DOCUMENTS

| | | |
|---|---|---|
| 6,286,094 B1 | 9/2001 | Derrick et al. |
| 6,418,527 B1 | 7/2002 | Rozenshein et al. |
| 6,490,612 B1 | 12/2002 | Jones et al. |

(Continued)

OTHER PUBLICATIONS

Patel et al.; rePLay: A Hardware Framework for Dynamic Optimization; 2001; IEEE.*

(Continued)

*Primary Examiner* — Corey S Faherty
(74) *Attorney, Agent, or Firm* — Michael R. Long; Steven L. Bennett

(57) ABSTRACT

A technique of processing instructions for execution by a processor includes determining whether a first property of a first instruction and a second property of a second instruction are compatible. The first instruction and the second instruction are grouped in an instruction group in response to the first and second properties being compatible and a feedback value generated by a feedback function indicating the instruction group has been historically beneficial with respect to a benefit metric of the processor. Group formation for the first and second instructions is performed according to another criteria, in response to the first and second properties being incompatible or the feedback value indicating the grouping of the first and second instructions has not been historically beneficial.

12 Claims, 10 Drawing Sheets

(56) References Cited

U.S. PATENT DOCUMENTS

| | | | |
|---|---|---|---|
| 6,775,787 B2* | 8/2004 | Greene | G06F 1/3203 712/E9.049 |
| 6,795,908 B1 | 9/2004 | Lee et al. | |
| 7,020,765 B2* | 3/2006 | Nguyen | G06F 9/3853 712/200 |
| 7,140,019 B2 | 11/2006 | May et al. | |
| 7,269,715 B2 | 9/2007 | Le et al. | |
| 7,340,589 B2 | 3/2008 | Kudo | |
| 7,590,823 B1* | 9/2009 | Ansari | G06F 9/3877 712/200 |
| 8,095,777 B2 | 1/2012 | Blaner et al. | |
| 8,127,115 B2 | 2/2012 | Doing et al. | |
| 8,166,279 B2 | 4/2012 | Blaner et al. | |
| 8,607,211 B2 | 12/2013 | Blainey et al. | |
| 8,615,745 B2 | 12/2013 | Blainey et al. | |
| 8,667,476 B1 | 3/2014 | Jung | |
| 9,678,756 B2 | 6/2017 | Gschwind | |
| 9,678,757 B2 | 6/2017 | Gschwind | |
| 2002/0056035 A1 | 5/2002 | Rozenshein et al. | |
| 2006/0010305 A1* | 1/2006 | Maeda | G06F 9/3885 712/34 |
| 2008/0016249 A1 | 1/2008 | Ellis et al. | |
| 2009/0319739 A1 | 12/2009 | Shpeisman et al. | |
| 2010/0064118 A1* | 3/2010 | Moore | G06F 9/3802 712/206 |
| 2010/0153953 A1 | 6/2010 | Adl-Tabatabai et al. | |
| 2010/0274995 A1* | 10/2010 | Matsuyama | G06F 9/3838 712/216 |
| 2014/0013060 A1 | 1/2014 | Frey et al. | |

OTHER PUBLICATIONS

Guillouard, S. "Parallel Stack Decoding for MIMO schemes", Jul. 30, 2009.

Pearce, R. "Means for Decoding Complex Condition Indications from Simple Displays", Jul. 10, 2013.

Cain et al. "Robust Architectural Support for Transactional Memory in the Power Architecture." ACM SIGARCH Computer Architecture News 41.3 (2013) pp. 225-236.

Harlod T. Cain et al., U.S. Appl. No. 14/309,443, filed Jun. 19, 2014, Non-Final Office Action dated Jan. 21, 2016.

Harlod T. Cain et al., U.S. Appl. No. 14/309,443, filed Jun. 19, 2014, Non-Final Office Action dated Jul. 22, 2016.

Harlod T. Cain et al., U.S. Appl. No. 14/309,443, filed Jun. 19, 2014, Final Office Action dated Nov. 18, 2016.

Harlod T. Cain et al., U.S. Appl. No. 14/309,443, filed Jun. 19, 2014, Notice of Allowance dated Feb. 28, 2017.

Harlod Cain et al., U.S. Appl. No. 14/487,744, filed Sep. 16, 2014, Non-Final Office Action dated Jan. 21, 2016.

Harlod Cain et al., U.S. Appl. No. 14/487,744, filed Sep. 16, 2014, Non-Final Office Action dated Jul. 22, 2016.

Harlod Cain et al., U.S. Appl. No. 14/487,744, filed Sep. 16, 2014, Final Office Action dated Nov. 18, 2016.

Harlod Cain et al., U.S. Appl. No. 14/487,744, filed Sep. 16, 2014, Notice of Allowance dated Feb. 28, 2017.

Michael K. Gschwind et al., U.S. Appl. No. 14/543,434, filed Nov. 17, 2014, Non-Final Office Action dated Dec. 6, 2016.

Michael K. Gschwind et al., U.S. Appl. No. 14/543,434, filed Nov. 17, 2014, Final Office Action dated Apr. 11, 2017.

Michael K. Gschwind et al., U.S. Appl. No. 14/734,862, filed Jun. 9, 2015, Non-Final Office Action dated Dec. 6, 2016.

Michael K. Gschwind et al., U.S. Appl. No. 14/734,862, filed Jun. 9, 2015, Final Office Action dated Apr. 11, 2017.

Michael K. Gschwind et al., U.S. Appl. No. 14/543,533, filed Nov. 17, 2014, Non-Final Office Action dated Dec. 6, 2016.

Michael K. Gschwind et al., U.S. Appl. No. 14/543,533, filed Nov. 17, 2014, Notice of Allowance dated Apr. 11, 2017.

* cited by examiner

INSTRUCTION GROUP FORMATION TECHNIQUES FOR DECODE-TIME INSTRUCTION OPTIMIZATION BASED ON FEEDBACK

This application is a continuation of U.S. patent application Ser. No. 14/543,533, entitled "TECHNIQUES FOR INSTRUCTION GROUP FORMATION FOR DECODE-TIME INSTRUCTION OPTIMIZATION BASED ON FEEDBACK," filed Nov. 17, 2014, the disclosure of which is incorporated herein by reference in its entirety for all purposes.

BACKGROUND

The disclosure is generally directed to techniques for instruction group formation and, more particularly, to techniques for instruction group formation for decode-time instruction optimization based on feedback.

Traditionally, processors employed in conventional computer systems (data processing systems) executed program instructions one at a time in sequential order. The process of executing a single instruction has usually included several sequential steps. A first step generally involved fetching the instruction from a storage device. A second step generally involved decoding the instruction and assembling any operands. A third step generally involved executing the instruction and storing the results. Some processors have been designed to perform each step in a single processor clock cycle. Other processors have been designed so that the number of processor clock cycles per step depends on the instruction. Modern data processing systems commonly use an instruction cache memory (cache) to temporarily store blocks of instructions. As is known, caches are buffers that store information retrieved from main memory to facilitate accessing the information with lower latency. If a processor locates a desired instruction (or data) in a cache, a 'cache hit' occurs and instruction execution speed is generally increased as cache tends to be faster than main memory. However, if a cache does not currently store a desired instruction (or data), a 'cache miss' occurs and a block that includes the desired instruction (or data) must be brought into the cache (i.e., retrieved from main memory).

Fetching instructions from cache (or main memory) is normally controlled by a program counter. Contents of a program counter typically indicate a starting memory address from which a next instruction or instructions is to be fetched. Depending on processor design, each instruction may have a fixed length or a variable length. For example, a processor may be designed such that all instructions have a fixed length of thirty-two bits (i.e., four bytes). Fixed length instruction formats tend to simplify the instruction decode process. Modern data processing systems commonly use a technique known as pipelining to improve performance. Pipelining involves the overlapping of sequential steps of an execution process. For example, while a processor is performing an execution step for one instruction, the processor may simultaneously perform a decode step for a second instruction and a fetch of a third instruction. As such, pipelining can decrease execution time for an instruction sequence. Superpipelined processors attempt to further improve performance by overlapping the sub-steps of the three sequential steps discussed above.

Another technique for improving processor performance involves executing two or more instructions in parallel. Processors that execute two or more instructions in parallel are generally referred to as superscalar processors. The ability of a superscalar processor to execute two or more instructions simultaneously depends on the particular instructions being executed. For example, two instructions that both require use of a same processor resource (e.g., a same floating point unit (FPU)) cannot be executed simultaneously, as a resource conflict would occur. Two instructions that both require use of the same processor resource cannot usually be combined or grouped with each other for simultaneous execution, but must usually be executed alone or grouped with other instructions. Additionally, an instruction that depends on the result produced by execution of a previous instruction cannot usually be grouped with the previous instruction. An instruction that depends on the result of the previous instruction is said to have a data dependency on the previous instruction. Similarly, an instruction may have a procedural dependency on a previous instruction that prevents the instructions from being grouped in a same group. For example, an instruction that follows a branch instruction cannot usually be grouped with the branch instruction, since the execution of the instruction depends on whether the branch is taken.

BRIEF SUMMARY

A technique of processing instructions for execution by a processor includes determining whether a first property of a first instruction and a second property of a second instruction are compatible. The first instruction and the second instruction are grouped in an instruction group in response to the first and second properties being compatible and a feedback value generated by a feedback function indicating the instruction group has been historically beneficial with respect to a benefit metric of the processor. Group formation is performed according to another criteria for the first and second instructions, in response to the first and second properties being incompatible or the feedback value indicating the grouping of the first and second instructions has not been historically beneficial.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

Figure 1:
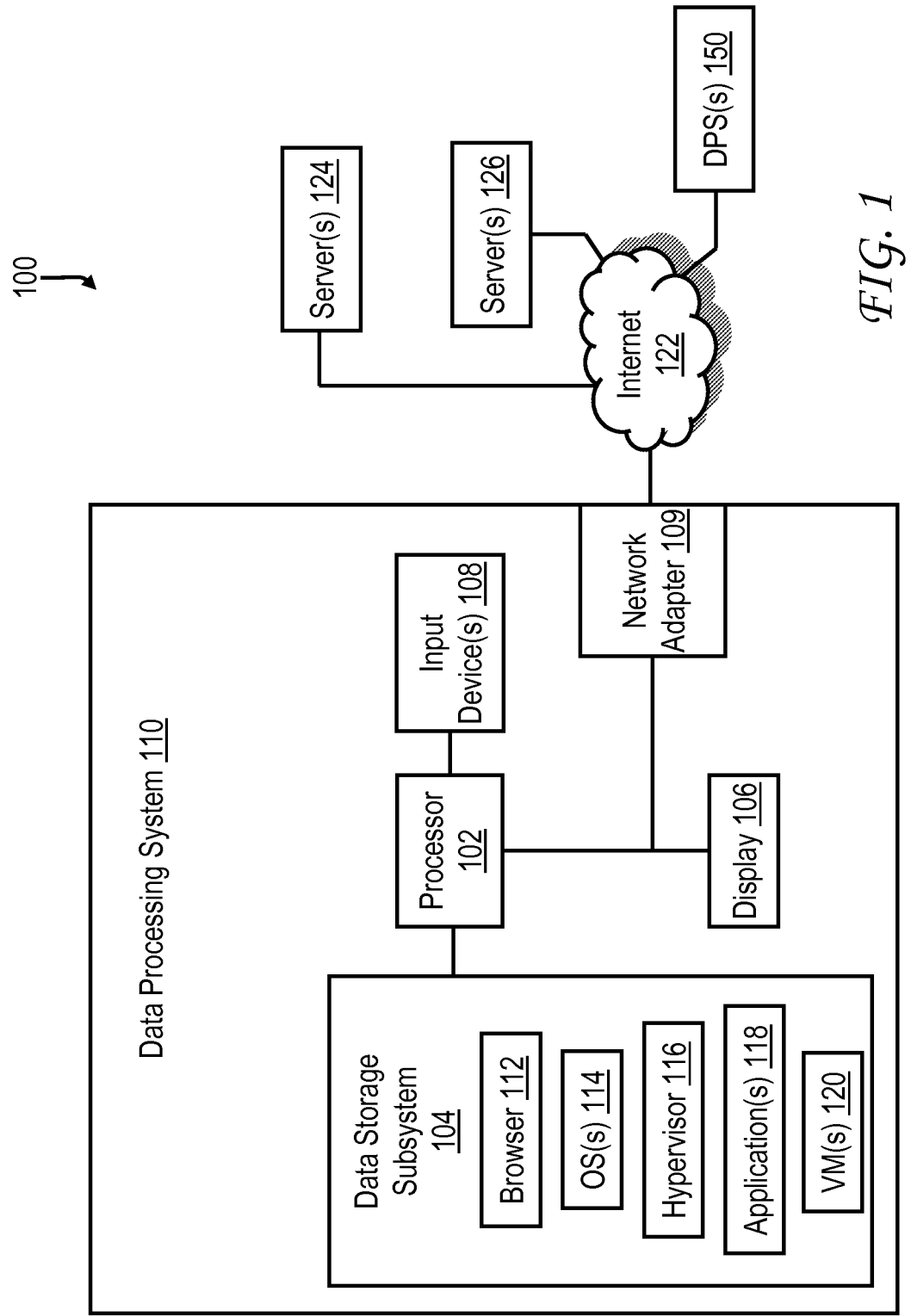
FIG. 1 is a diagram of a relevant portion of an exemplary data processing system environment that includes a data processing system that is configured to group instructions for decode-time instruction optimization (DTIO), according to the present disclosure.

The illustrative embodiments provide a method, a processor, and a data processing system configured to group instructions for decode-time instruction optimization (DTIO) based on feedback.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As used herein, the term 'coupled' may encompass a direct connection between components or elements or an indirect connection between components or elements utilizing one or more intervening components or elements. As may be used herein, the term 'system memory' is synonymous with the term 'main memory' and does not include 'cache' or 'cache memory'. While various PowerPC™ instructions are referenced herein, it should be appreciated that the present disclosure is not limited to the instruction set architecture (ISA) employed by PowerPC.

In general, a superscalar processor must be able to determine whether two or more given instructions can be grouped. Since a grouping determination that does not employ speculation cannot be made without first decoding instructions, grouping determinations have commonly been made by an instruction decode unit as instructions are fetched from cache. Compiler techniques may also be used to assist an instruction decode unit in determining (as instructions are fetched from cache) whether two or more instructions can be executed in parallel. When a processor decodes instructions from cache there are penalties that may be incurred. A first penalty occurs during an instruction cache miss. A cache miss delays execution time as instructions must first be fetched from main memory (which is typically slower than cache) and then decoded. Additionally, decoding on-the-fly significantly slows the speed of instruction execution, since execution of the instruction must wait for the instruction decode unit (with the aid of compilers and software in some systems) to decide if there are any data dependencies, procedural dependencies, and/or resource conflicts (before dispatching instructions for optimal simultaneous execution).

To speed-up instruction execution time, some compiler systems have attempted to gather information regarding the feasibility of grouping instructions for simultaneous dispatch, prior to the instructions being fetched from an instruction cache (or combination instruction and data cache). Compiler systems that gather grouping information may facilitate simplification of instruction decode unit hardware. To gather information prior to instructions being fetched from cache, some conventional superscalar processor system architectures utilize software compilers when generating machine instructions from source code to determine (in advance of fetching the instruction from cache) whether groups of instructions can be dispatched simultaneously to processor functional units. Such conventional systems may then encode one or more bits in an actual instruction operational code (opcode) to be utilized by the instruction decode unit hardware.

There are a number of disadvantages associated with compiler predecode techniques. A first disadvantage of compiler predecode techniques is that predecode information is employed as part of an ISA, which means that every possible processor implementation must interpret the predecode information identically to have compiled code perform optimally. In this case, flexibility for every possible processor implementation to optimize the number and encoding of the predecoded information in opcode is sacrificed. A second disadvantage of compiler predecode techniques is that performance improvements in superscalar instruction execution can only be realized on code that was generated with compilers that are modified to correctly predecode instructions and encode the opcode bits correctly. A third disadvantage is that the compiler predecode techniques require using bits in an actual instruction opcode, which reduces the amount of information that can otherwise be encoded (restricting how many bits of predecode information can practically be used by the system).

A known data processing system implements a predecode unit, coupled between main memory and cache, that produces predecode bits for instructions as the instructions are copied from the main memory to the cache. The predecode unit includes two paths for transporting instruction information: a predecode path; and an instruction path. The instruction path buffers instructions sent from main memory to cache as information from the instructions are decoded in the predecode path. The predecode path detects what type of instructions are filling a cache miss and detects whether two instructions can be grouped. The predecode information is stored in cache, along with the instruction pairs as predecode bits. Predecode bits may be stored with instruction pairs in individual predecode-bit storage or the predecode bits may be stored elsewhere in the system for optimum utilization.

Due to the desire for high-frequency and relatively short processor pipelines in modern processors, it is desirable to perform limited instruction analysis in a predecode stage. As mentioned above, limited predecode information may be utilized for instruction group formation. To avoid suboptimal group formation, it would be desirable for predecode information to have a global context. However, global analysis may not be possible in a predecode stage, as instruction information may not be available (e.g., a predecode stage may not have instruction visibility across cache boundaries, such as cache line, cache sector, or cache subline boundaries). Accordingly, decisions on group formation may have to be made based on limited information, which may lead to significantly degraded group quality and overall processor performance degradation rather than the sought after improvement to be delivered by decode-time instruction optimization (DTIO). According to aspects of the present disclosure, feedback is provided on speculative group formation to reduce the possibility of group formation leading to overall processor performance degradation.

According to an embodiment of the present disclosure, a first analysis classifies instructions based on instruction classes, e.g., whether an instruction is a candidate for being a first instruction in a DTIO two-instruction group or a second instruction in a two-instruction group. According to various embodiments, a group that includes first and second instructions is only formed when a suitable combination of first and second instructions is found (e.g., at the expense of other criteria). According to one aspect, a group formation unit may group two instructions that have not conventionally been a DTIO candidate sequence. In one or more embodiments, whether a DTIO grouping is performed may be based on exhaustive analysis that provides feedback on the desirability of past DTIO groups for an instruction pair. More detailed group analysis may offer several sets of information (e.g., compatible classes, instruction hashes, and/or instruction operand hashes) to facilitate identification of relationships between instruction candidates.

As the sets of information require only a limited exchange of information and limited logic to combine (e.g., a single AND gate), comparatively far more information may be utilized in an instruction grouping decision, by predecoding partial information to identify candidates for combination during predecode and combining the predecoded information during group formation. However, depending on specific code sequences used by an application, one or more code patterns may trigger group formation for DTIO when DTIO does not apply or DTIO does not offer an advantage. That is, DTIO may degrade processor performance instead of improving processor performance. Feedback has not traditionally been used to determine a best processor operation mode.

In accordance with one or more embodiments of the present disclosure, feedback is employed to determine whether DTIO is effective at improving performance. In one embodiment, feedback is tracked at a hardware core level. In another embodiment, feedback is tracked at a hardware thread level. In other embodiments, feedback may be updated by hardware and/or context switched with partitions, processes, and/or threads. According to one aspect of the present disclosure, a cost function is employed to determine whether speculative micro-architectural optimization (i.e., DTIO) has been empirically successful. In response to the cost function indicating the speculative micro-architectural optimization has not been successful in improving processor performance, the speculative micro-architectural optimization is discontinued.

With reference to FIG. 1, an exemplary data processing environment 100 is illustrated that includes a data processing system 110 that is configured, according to one or more embodiments of the present disclosure, to identify instructions for decode-time instruction optimization (DTIO) grouping, for example, in view of feedback. Data processing system 110 may take various forms, such as workstations, laptop computer systems, notebook computer systems, desktop computer systems or servers and/or clusters thereof. Data processing system 110 includes one or more processing units or processors 102 (each of which may include one or more processor cores for executing program code) coupled to a data storage subsystem 104, optionally a display 106, one or more input devices 108, and a network adapter 109. Data storage subsystem 104 may include, for example, application appropriate amounts of various memories (e.g., dynamic random access memory (DRAM), static RAM (SRAM), and read-only memory (ROM)), and/or one or more mass storage devices, such as magnetic or optical disk drives.

Data storage subsystem 104 includes one or more operating systems (OSs) 114 for data processing system 110. Data storage subsystem 104 may also include application programs, such as a browser 112 (which may optionally include customized plug-ins to support various client applications), a hypervisor (or virtual machine monitor (VMM)) 116 for managing one or more virtual machines (VMs) 120 as instantiated by different OS images, and other applications (e.g., a word processing application, a presentation application, and an email application) 118.

Display 106 may be, for example, a cathode ray tube (CRT) or a liquid crystal display (LCD). Input device(s) 108 of data processing system 110 may include, for example, a mouse, a keyboard, haptic devices, and/or a touch screen. Network adapter 109 supports communication of data processing system 110 with one or more wired and/or wireless networks utilizing one or more communication protocols, such as 802.x, HTTP, simple mail transfer protocol (SMTP), etc. Data processing system 110 is shown coupled via one or more wired or wireless networks, such as the Internet 122, to various file servers 124 and various web page servers 126 that provide information of interest to the user of data processing system 110. Data processing environment 100 also includes one or more data processing systems (DPSs) 150 that are configured in a similar manner as data processing system 110. In general, data processing systems 150 represent data processing systems that are remote to data processing system 110 and that may execute OS images that may be linked to one or more OS images executing on data processing system 110.

Those of ordinary skill in the art will appreciate that the hardware components and basic configuration depicted in FIG. 1 may vary. The illustrative components within data processing system 110 are not intended to be exhaustive, but rather are representative to highlight components that may be utilized to implement the present invention. For example, other devices/components may be used in addition to or in place of the hardware depicted. The depicted example is not meant to imply architectural or other limitations with respect to the presently described embodiments.

Figure 2A:
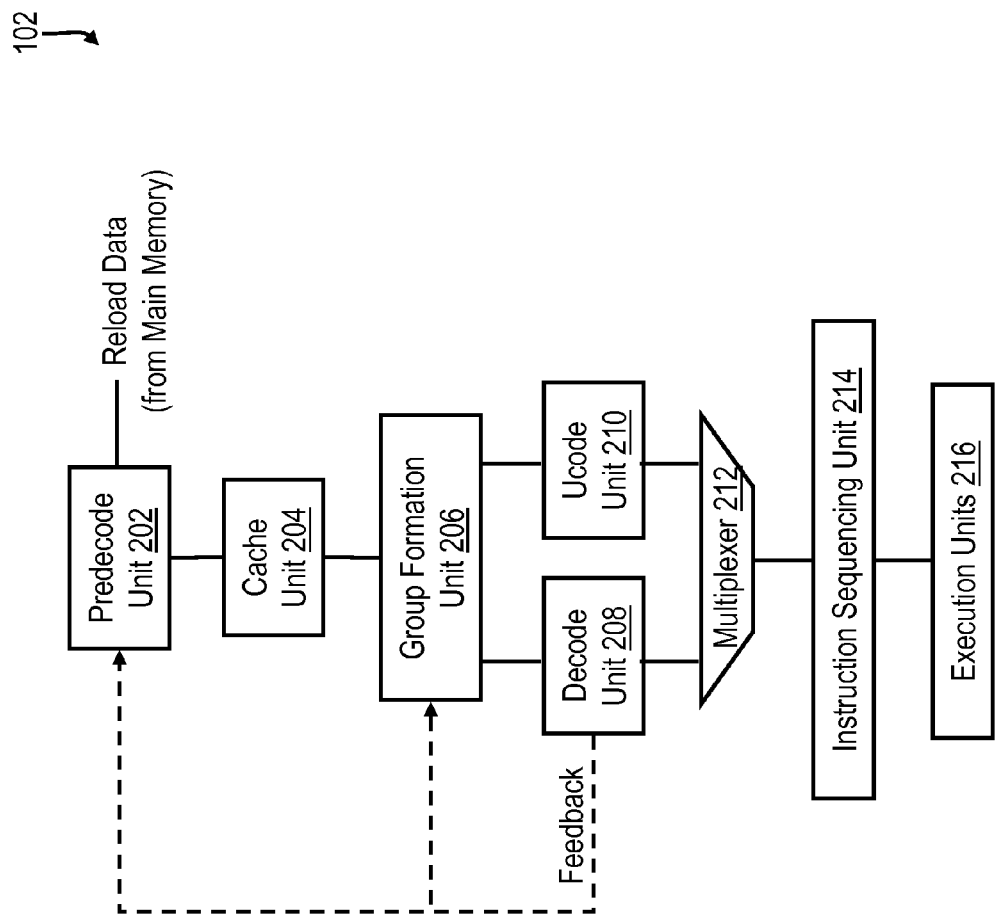
FIG. 2A is a diagram of relevant portions of an exemplary processor implemented in the data processing system of FIG. 1.

With reference to FIG. 2A, relevant portions of processor 102 are illustrated in additional detail, according to an embodiment of the present disclosure. Processor 102 includes a predecode unit 202 that is configured to receive reload data from main memory (e.g., included in data storage subsystem 104) on a cache miss. As is discussed further herein, predecode unit 202 is configured to analyze received instructions. For example, predecode unit 202 may analyze all of the instructions in a cache sector (e.g., thirty-two bytes) or a cache line (e.g., one-hundred twenty-eight bytes) upon reload. In various embodiments, predecode unit 202 is configured to create instruction property information for each of the analyzed instructions. For example, the created instruction property information may indicate whether each of the instructions is a first candidate instruction or a second candidate instruction for an instruction group when an instruction is, for example, a boundary instruction. When the instruction is not a boundary instruction predecode unit 202 may also provide an indication when two adjacent instruction should be grouped. In at least one embodiment, predecode unit 202 is also configured to modify the instruction property information based on feedback (as to whether an instruction pairing has been historically beneficial to the performance of processor 102) provided by, for example, decode unit 208. In various embodiments, predecode unit 202 is also configured to initiate storage of the instruction property information in association with the instructions. For example, the instruction property information may be stored in a memory array of cache unit 204 in conjunction with an associated instruction or may be stored in another location in cache unit 204.

Group formation unit 206 is configured to fetch instructions stored in cache unit 204 for grouping. Group formation unit 206 examines instruction properties to determine how to group fetched instructions. For example, group formation unit 206 may examine a first property of a first instruction and a second property of a second instruction and determine whether the properties for the first and second instructions are compatible. In accordance with an aspect of the present embodiment, the properties of the first and second instructions correspond to one or more bits stored in conjunction with an instruction in cache unit 204. In accordance with one aspect, the first and second properties are generated by predecode unit 202. For example, group formation unit 206 may determine the first instruction is a first instruction candidate for a group and a subsequent second instruction is a second instruction candidate for a DTIO sequence, i.e., a sequence of instructions which may be optimized by DTIO, based on the predecoded instruction properties.

In accordance with one embodiment, compatible instructions that may form a beneficial DTIO sequence are placed in the same group. In at least one embodiment, the properties correspond to broad instruction classes that may be combined in a DTIO sequence, but not every sequence may be an eligible DTIO sequence. In accordance with one embodiment, any boundary instruction that may be a first instruction of a DTIO sequence is marked and every boundary instruction that may be a second instruction of a DTIO sequence is marked. In general, not every combination of any first instruction of an instruction sequence with any second instruction of an instruction sequence is a DTIO sequence. In response to the properties for the first and second instructions not being compatible, group formation unit 206 performs group formation according to another criteria (e.g., to maximize groups or minimize groups).

In one embodiment, group formation unit 206 receives feedback directly from decode unit 208. In response to the properties for the first and second instructions being compatible and the feedback (provided by decode unit 208) indicating grouping the first and second instructions results in a valid DTIO sequence, group formation unit 206 continues to group the first and second instructions when presented in an instruction stream. In accordance with another embodiment, properties stored, for example, in instruction cache unit 204 are updated based on the feedback. In another embodiment, feedback is further used to indicate that combining instructions in an instruction group has been historically beneficial in improving performance of processor 102. In this case, instruction properties are updated to cause group formation unit 206 to form a group with the first and second instruction candidates.

In accordance with another embodiment, properties stored, for example, in cache unit 204 are updated. In response to the feedback indicating the instruction grouping has not been historically beneficial, group formation unit 206 does not form a group with the first and second instruction candidates. Group formation unit 206 may form an instruction group based on other criteria when feedback indicates an instruction grouping has not been historically beneficial. When group formation unit 206 does not receive feedback directly from decode unit 208 (e.g., predecode unit 202 received the feedback from decode unit 208 and incorporated the feedback when creating the instruction property information), in response to the properties for the first and second instructions being compatible group formation unit 206 forms a group with the first and second instruction candidates. In another embodiment, cache unit 204 receives the feedback and updates instruction property information stored in cache unit 204 directly.

Decode unit 208 is configured to perform a full decode on grouped instructions and perform DTIO (e.g., combining compatible instructions that are grouped or improving sequences of compatible instructions by transforming them into another group that is more efficient to execute by one or more of instruction scheduling unit (ISU) 214 and execution units 216). In various embodiments, decode unit 208 is also configured to provide feedback to group formation unit 206, instruction cache unit 204, and/or predecode unit 202 based on whether grouping of particular instruction pairs has improved processor 102 performance. Depending on the instruction type, microcode (ucode) unit 210 may be employed to generate microcode for a given instruction. Multiplexer 212 selects whether an output from decode unit 208 or microcode unit 210 is provided to ISU 214. ISU 214 is configured to dispatch instructions to various implemented execution units (floating-point units, fixed-point units, etc.) 216 based on instruction type.

Figure 2B:
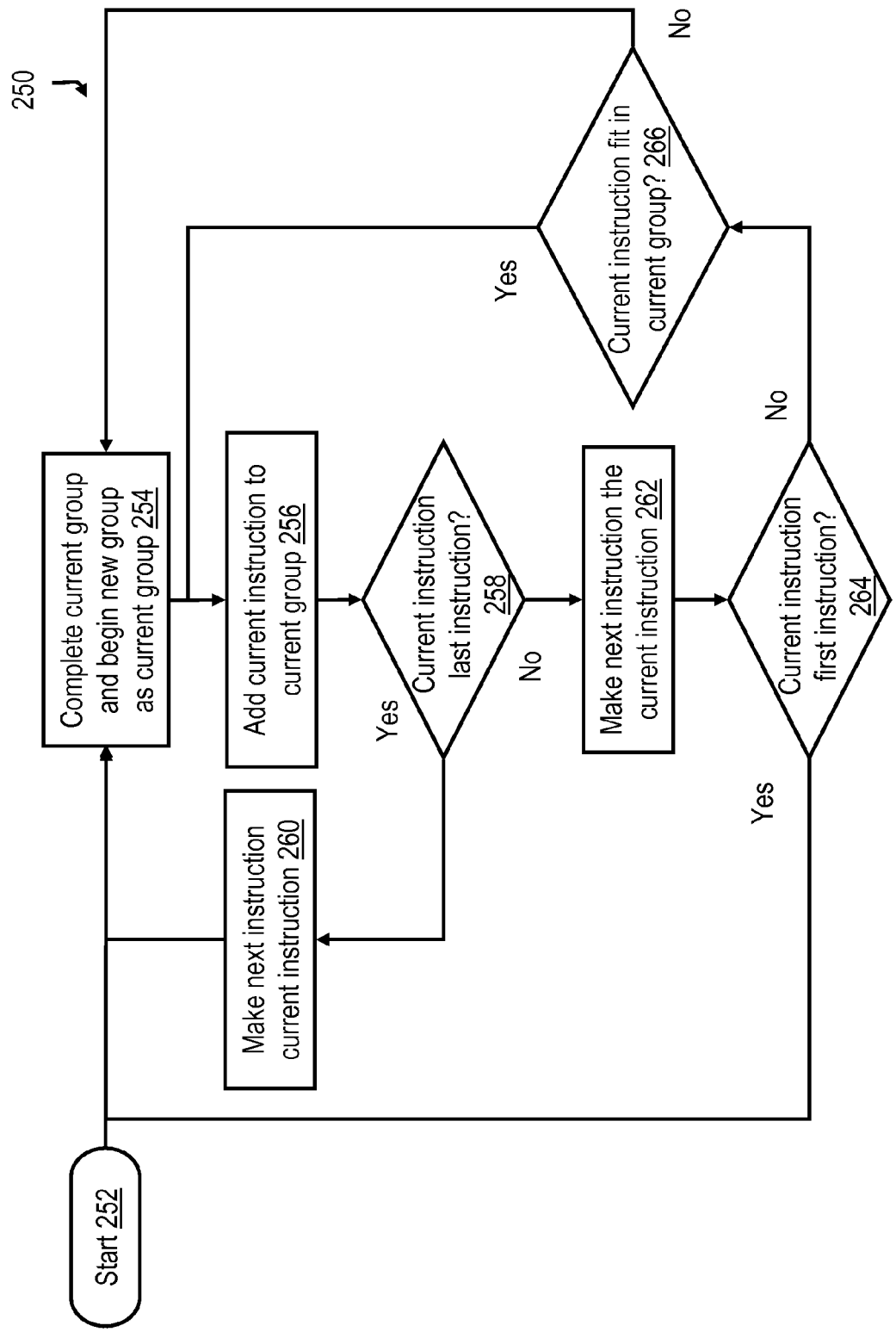
FIG. 2B is a flowchart of an exemplary instruction group formation process.

FIG. 2B illustrates an exemplary instruction group formation process 250 that may be performed by group formation unit 206. Process 250 is initiated in block 252, for example, in response to processor 102 being powered up. Next, in block 254, group formation unit 206 completes a current instruction grouping and begins a new instruction group as a current instruction group. Then, in block 256, group formation unit 206 adds a current instruction to the current instruction group. Next, in decision block 258, group formation unit 206 determines whether the current instruction is an instruction that must be a last instruction in an instruction group. In response to the current instruction being an instruction that must be last in an instruction group, control passes from block 258 to block 260 where a next instruction is made the current instruction. From block 260 control transfers to block 254. In response to the current instruction not being an instruction that must be a last instruction for an instruction group, control passes from block 258 to block 262 where a next instruction is made the current instruction.

Next, in decision block 264, group formation unit 206 determines whether the current instruction is an instruction that must be a first instruction in an instruction group. In response to the current instruction being an instructions that must be a first instruction in an current instruction group, control passes from block 264 to block 254. In response to the current instruction not being an instruction that must be a first instruction for an instruction group, control passes from block 264 to decision block 266. In block 266 group formation unit 206 determines whether the current instruction will fit into the current instruction group. In response to determining the current instruction will fit into the current instruction group control transfers from block 266 to block 256. In response to determining the current instruction will not fit into the current instruction group control transfers from block 266 to block 254. Those skilled in the art will understand that while process 250 is shown as operating sequentially on each instruction, the illustrated blocks may be reordered and or performed in parallel on a variety of embodiments while processor 102 is powered up.

Figure 2C:
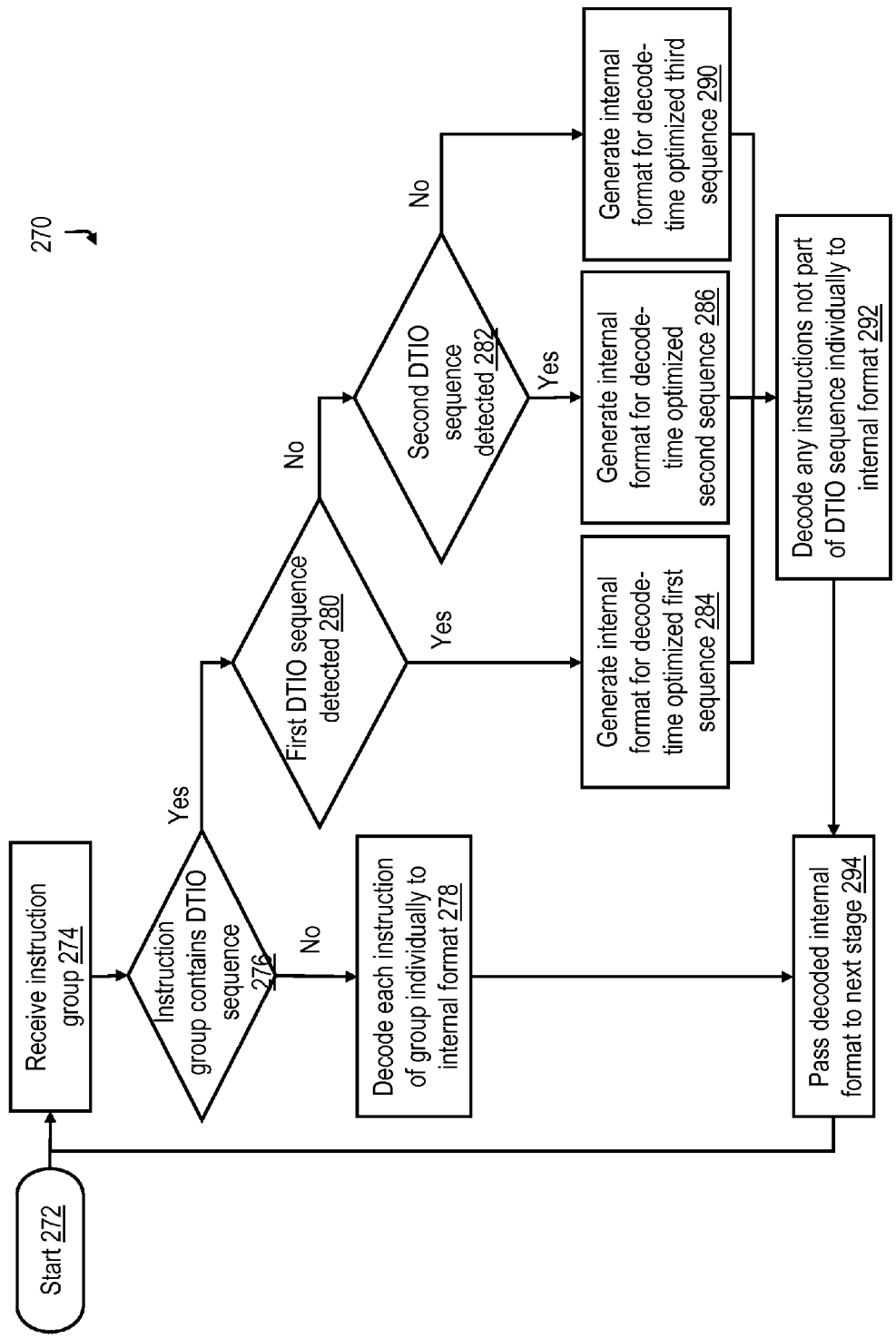
FIG. 2C is a flowchart of an exemplary DTIO process.

With reference to FIG. 2C, an exemplary process 270 is illustrated for decode unit 208. Decode unit 208 is adapted to perform instruction decoding of instruction groups and DTIO for instruction groups. In one exemplary embodiment, the instruction groups processed by process 270 of decode unit 208 are formed in accordance with group formation unit 206 performing process 250.

Process 270 is initiated in block 272 at which point control transfers to block 274. In block 274 an instruction group is received by decode unit 208. In block 276 decode unit 208 determines whether the instruction group contains a sequence that can be optimized with DTIO by replacing a first sequence of received instructions with a second sequence of equivalent instructions that are adapted to execute in a more efficient manner. In response to the instruction group not including a sequence that may be improved with DTIO, control passes to block 278. In block 278 each instruction in the instruction group is decoded in accordance with the decoding requirements of processor 102 and, in particular, with the decoding requirements of ISU 214 and execution units 216 to an appropriate internal format. Control then passes from block 278 to block 294, where the decoded internal format is passed to a next stage. From block 294 control transfers to block 274.

In response to the group including a sequence that may be improved using DTIO, control passes from block 276 to block 280. In block 280, the current instruction group has been identified as containing a DTIO sequence and a determination is made as to whether the DTIO sequence corresponds to a first DTIO sequence. If the current instruction group contains a first DTIO sequence in block 280, control passes from block 280 to block 284. In block 284, the internal format of processor 102 (for the optimized (output) instruction execution sequence corresponding to the first (input) instruction execution sequence corresponding to a first DTIO sequence) is generated responsive to detecting the first instruction execution sequence. Control then passes from block 284 to block 292, where instructions that are not part of the DTIO sequence are individually decoded to the internal format. From block 292 control transfers to block 294.

If the current instruction group does not contain a first DTIO sequence in block 280, control passes from block 280 to block 282. In block 282, as the current instruction group has been identified as containing a DTIO sequence, a determination is made as to whether the DTIO sequence corresponds to a second DTIO sequence. If the current instruction group contains a second DTIO sequence in block 282, control passes from block 282 to block 286. In block 286, the internal format of processor 102 (for the optimized (output) instruction execution sequence corresponding to the second (input) instruction execution sequence corresponding to a second DTIO sequence) is generated responsive to detecting the second instruction execution sequence. Control then passes from block 286 to block 292. If the current instruction group does not contain a second DTIO sequence in block 282, control passes from block 282 to block 290. In an exemplary embodiment with three DTIO sequences, in block 290 (when control passes from block 282 to block 290), the sequence of blocks 276, 280, 282 has established that the current instruction group contains a DTIO sequence and that the DTIO sequence does not correspond to a first DTIO sequence or a second DTIO sequence.

Consequently, in block 290, the current instruction group is identified as including a third DTIO sequence and the internal format of processor 102 (for the optimized (output) instruction execution sequence corresponding to the third (input) instruction execution sequence corresponding to a third DTIO sequence) is generated responsive to determining the presence of the third instruction execution sequence. Control then passes from block 290 to block 292. As mentioned above, in block 292 any instructions in the instruction group not corresponding to instructions of a detected and optimized DTIO sequence are decoded to the internal format of processor 102 and control then passes from block 292 to block 294. In block 294, the internal format corresponding to instructions having been at least one of decoded and generated by at least one of blocks 278, 284, 286, 290, and 292 is transferred to the next pipeline stage (for example, to ISU 214 via multiplexer 212, in one exemplary embodiment) and control passes from block 294 to 274. Those skilled in the art will understand that while process 270 is shown as operating sequentially on each instruction, the illustrated blocks may be reordered and/or performed in parallel on a variety of embodiments while processor 102 is powered up.

Figures 3, 4:
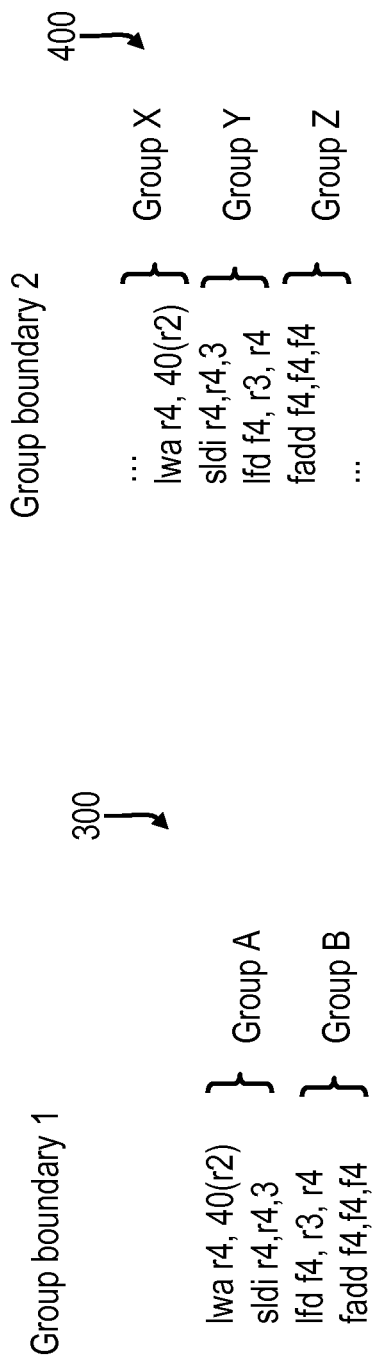
FIG. 3 is a diagram of an exemplary instruction sequence that illustrates multiple instruction groups in which one of the instruction groups includes instructions that can be fused due to how the instruction groups were formed.
FIG. 4 is a diagram of an exemplary instruction sequence that illustrates multiple instruction groups in which none of the instruction groups includes instructions that can be fused due to how the instruction groups were formed.

With reference to FIG. 3, an exemplary instruction sequence 300 for a processor is illustrated with a group size of two. When only intra-group fusion is employed on a two instruction group, a probability of missing a fusion opportunity exists. As should be appreciated, instructions have to be in a same instruction group in order to be combined (i.e., fused). For example, assume two adjacent instructions in an instruction stream are add instructions, one of which adds a first value and the other of which adds a second value to a same register. If the two add instructions are in different groups, the two add instructions cannot be combined. However, if the two add instructions are in the same group, the two instructions can be combined into a single add instruction (that adds the sum of the first and second values to the register) by a decode unit for more efficient execution. That is, when groups are formed solely based on a position of an instruction in an instruction sequence, a fusion opportunity may be missed.

For inter-group fusion, fusing two instruction patterns will not result in a reduction of the number of operations to be performed, but may provide relief on critical paths by shortening dependency chains. In instruction sequence 300 of FIG. 3 fusion can occur in the decode unit for the 'LWA' and 'SLDI' instructions, as the instructions are in the same group (i.e., group A). With reference to FIG. 4, an instruction sequence 400 is illustrated in which a fusion opportunity is missed as instructions that could have been grouped (i.e., the 'LWA' and 'SLDI' instructions) are in different groups (i.e., group 'X' and group 'Y', respectively).

Figures 5, 6:
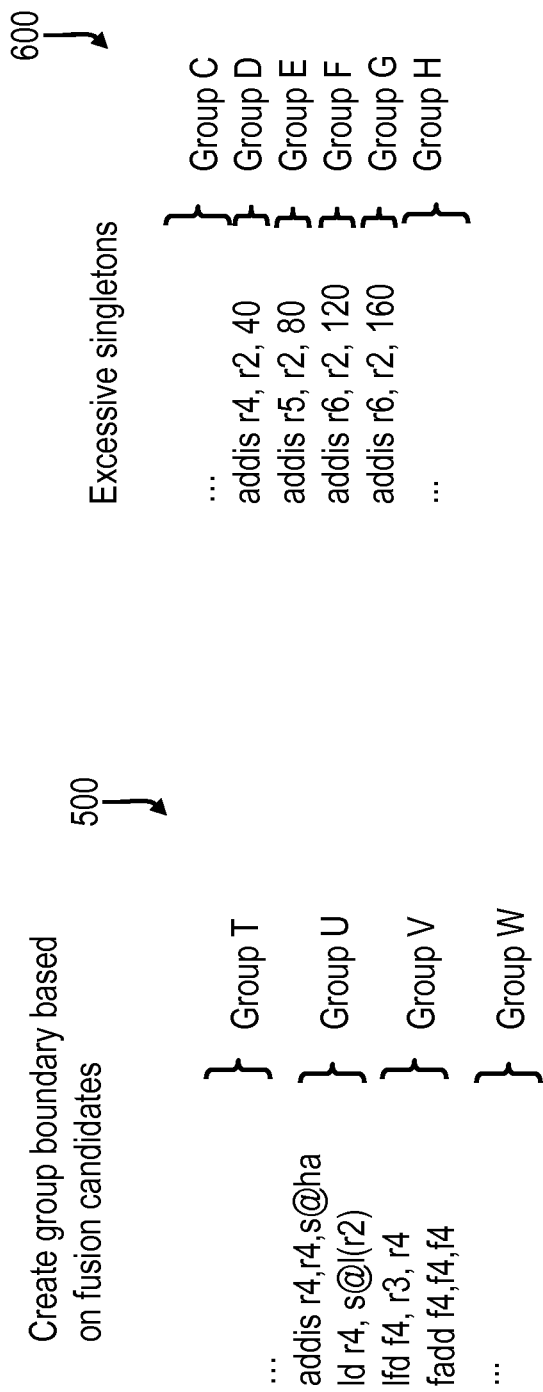
FIG. 5 is a diagram of an instruction sequence that illustrates multiple instruction groups that have boundaries that were created based on fusion instruction candidates.
FIG. 6 is a diagram of an instruction sequence that illustrates multiple single instruction groups, whose boundaries were created based on fusion candidates, that may reduce processor performance.

Missed fusion opportunities may be addressed based on creating group boundaries based on detecting fusion candidates that may represent a start of a DTIO sequence. With reference to FIG. 5, an instruction sequence 500 is illustrated in which starting a new group 'U' responsive to the detection of an 'ADDIS' instruction based on local information (i.e., responsive to the detection of the 'ADDIS' instruction only) may improve processor performance (as fusion can occur between the 'ADDIS' and 'LD' instructions). It should be appreciated that information utilized to form groups may be limited due to, for example, limited visibility, wire reach, and cache predecode limitations in general (e.g., bit limitations) or specific cache predecode limitations at cache sector and cache line boundaries.

With reference to FIG. 6, an instruction sequence 600 is illustrated in which excessive singletons (i.e., groups formed consisting of a single instruction) degrade performance and prevent more efficient group formation with two instruction groups when a new instruction group is started responsive to an instruction that corresponds to a first instruction of a DTIO sequence. As such, it is desirable to identify possible sequences based on the decoding of more than a single instruction, even when predecode is able to predecode instructions in isolation or instructions within a cache unit (e.g., a cache sector, cache subline, or cache line). In general, cache sector boundaries and cache line boundaries prevent identification of a next instruction by a predecode unit, as bordering instructions (i.e., a first instruction in a subsequent cache sector or subsequent cache line) is not usually available for inspection by the predecode unit.

According to aspects of the present disclosure, speculative (i.e., probabilistic) instruction pairing is employed. For example, a first instruction in an instruction sequence may be identified as a fusion first instruction candidate and a second instruction in the instruction sequence may be identified as a fusion second instruction candidate. Exemplary logic for implementing probabilistic instruction pairing may take the following form:

---
IF i0.candidate_for_1$^{st}$ AND i1.candidate_for_2$^{nd}$ THEN
  start new group at i0 to group i0, i1
ELSE
  continue current group formation pattern
---

Figure 7A:
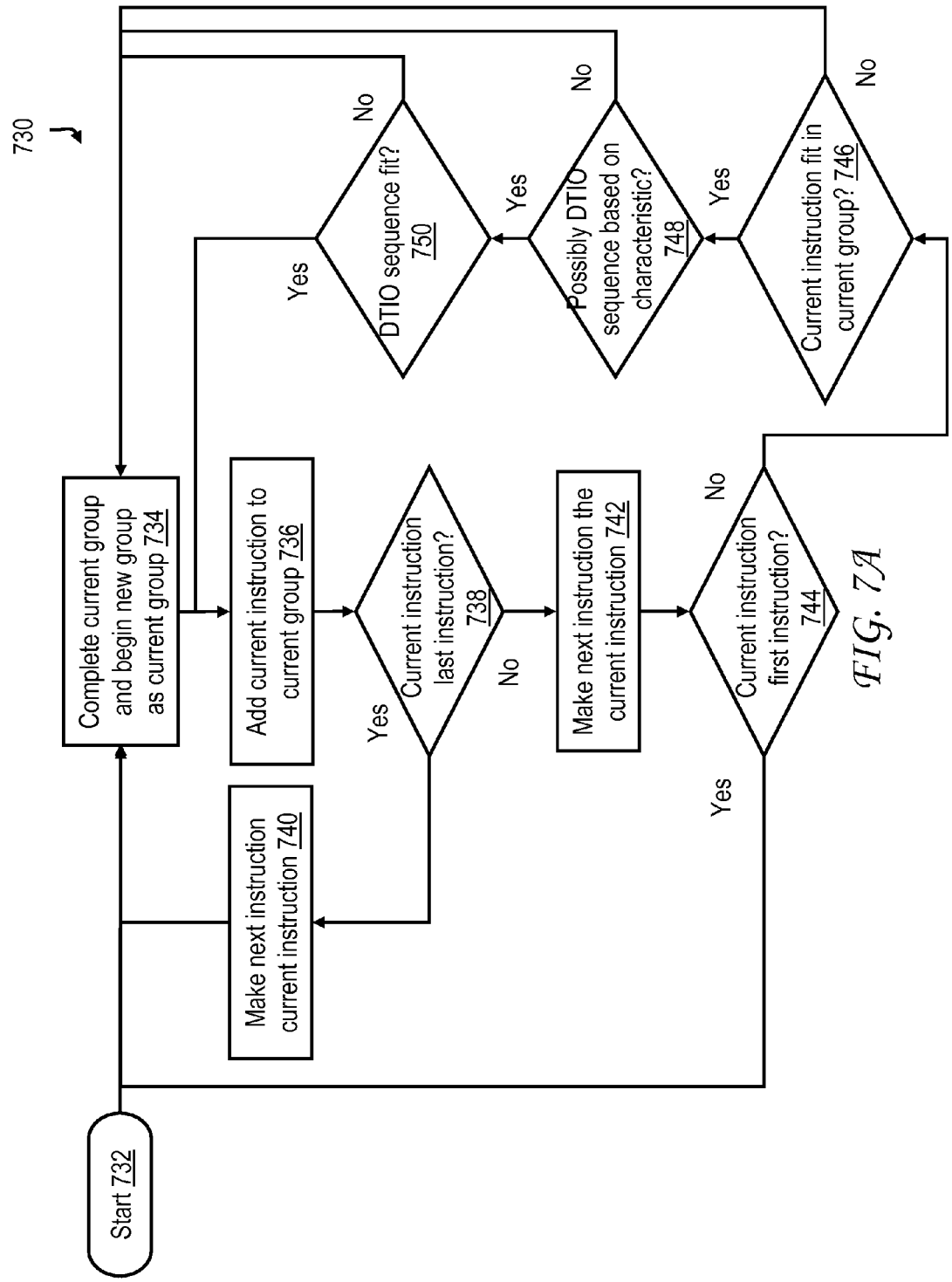
FIG. 7A is a flowchart of another exemplary instruction group formation process.

In at least one embodiment, group formation including probabilistic or speculative pairing is performed in conjunction with a modified group formation logic of process 250 of FIG. 2B, e.g., as shown in probabilistic group formation process 730 of FIG. 7A. More specifically, in at least one exemplary embodiment, exemplary logic implements process 730 of FIG. 7A and, more specifically, the test of block 748. In one embodiment, a new group is only started when a DTIO candidate sequence does not fit in a current instruction decode group in its entirety. Advantageously, only one signal for each of the first instruction and second instruction have to be considered. In various embodiments, a test for a possible DTIO sequence can be performed with a single AND gate, rather than logic requiring the analysis of up to thirty-two bits or more per instruction using many levels of logic gates and an associated delay.

Exemplary logic herein is represented in pseudo-code notation based on conventions in accordance with common hardware description languages, and in particular the VHDL language. However, following pseudo code notations, the '=' operator may be used for assignment in most instances rather than the '<=' and ':=' operators, and statements may omit a final semicolon, except in cases of possible ambiguity. Further, instructions (and specifically, the instruction bit pattern corresponding to an instruction or an instruction opcode) are presented by names, such as instruction (typically, when a single instruction is processed), and 'i0', 'i1', 'i2', and so forth, when more than one instruction is being processed and specifically referring to a first, second, third, and so forth, instruction, respectively. Attributes or properties are referred to with a '.' notation commonly associated with structure groupings in programming languages and hardware description languages such as VHDL. For example, the 'instructionst specifier' refers to the register 'RT' specifier of the instruction referred to by instruction and 'i0.class' refers to the property 'class' of instruction 'i0', and so forth. The meaning of fields should be apparent from the embodiment descriptions to those skilled in the art. Specific instructions are represented by their opcode, or opcode and operands as appropriate, with the comparison operator '=' performing a comparison on portions of fields, instructions opcodes, or entire instructions in accordance with the specified fields, instructions, instruction opcodes, and so forth. In one aspect of pseudo notations, values may be interpreted as 'FALSE' when one or more bit values corresponds to '0', and as 'TRUE' when one or more bits values do not correspond to '0'. Finally, high-level actions are described in English.

In general, instruction pairing information may be utilized to create useful group boundaries. For example, in exemplary instruction sequence 500 of FIG. 5 the 'ADDIS' instruction is a fusion first instruction candidate and the 'LD' instruction is a fusion second instruction candidate. Instruction pairing information may also be utilized to avoid useless boundaries. For example, in exemplary instruction sequence 600 of FIG. 6 the 'ADDIS' instructions are all fusion first instruction candidates. As such, forming groups with a single 'ADDIS' instruction and an empty slot may be avoided.

As one example, assuming the 'ADDIS' instruction is a fusion first instruction candidate and the 'LWZ' and 'LD' instructions are fusion second instruction candidates, a determination of whether consecutive instructions in an instruction sequence are candidates for grouping may be determined by implementing the following exemplary logic:

---
instruction.candidate_for_1st = FALSE
instruction.candidate_for_2nd = FALSE
IF instruction = ADDIS THEN
  instruction.candidate_for_1st = TRUE
ELSIF instruction = LWZ OR instruction = LD THEN
  instruction.candidate_for_2nd = TRUE
END IF
---

In accordance with one aspect of the present disclosure, computation of a candidate characteristic for DTIO is performed for each instruction irrespective of a second instruction in conjunction with which the instruction may be optimized during DTIO. In one embodiment, computation of a DTIO candidate characteristic for a first instruction is performed irrespective of at least a second instruction in conjunction with which the instruction may be optimized, when the first instruction is before a cache boundary and the second instruction is beyond the cache boundary. In accordance with an embodiment, the DTIO candidate characteristic of an instruction is computed prior to group formation in group formation unit 206. In accordance with another embodiment, the DTIO candidate characteristic is computed prior to entering cache unit 204, and is stored in at least one cache unit, e.g., cache unit 204. In accordance with at least one embodiment, analysis and storage of an instruction candidate characteristic property (and optionally other predecoded instruction properties) is performed in accordance with process 760 of FIG. 7B.

FIG. 7A illustrates an exemplary instruction group formation process 730 that may be performed by group formation unit 206. Process 730 is initiated in block 732, for example, in response to processor 102 being powered up. Next, in block 734, group formation unit 206 completes a current instruction grouping and begins a new instruction group as a current instruction group. Then, in block 736, group formation unit 206 adds a current instruction to the current instruction group. Next, in decision block 738, group formation unit 206 determines whether the current instruction is a last instruction for the current instruction group. In response to the current instruction being the last instruction for the current instruction group, control passes from block 738 to block 740 where a next instruction is made the current instruction. From block 740 control transfers to block 734. In response to the current instruction not being the last instruction for the current instruction group (e.g., the current instruction is the first instruction for the current instruction group) in block 738, control passes from block 738 to block 742 where a next instruction is made the current instruction.

Next, in decision block 744, group formation unit 206 determines whether the current instruction is an instruction that must be a first instruction in an instruction group. In response to the current instruction being an instructions that must be a first instruction in an current instruction group, control passes from 744 to block 734. In response to the current instruction not being an instruction that must be a first instruction for an instruction group, control passes from block 744 to decision block 746. In block 746 group formation unit 206 determines whether the current instruction will fit into the current instruction group. In response to determining the current instruction will fit into the current instruction group control transfers from block 746 to block 748. In response to determining the current instruction will not fit into the current instruction group control transfers from block 746 to block 734.

In block 748 group formation unit 206 determines whether the combined predecoded instruction properties (or instruction characteristics) of current instruction and one or more successive instructions indicate that the current instruction and one or more successive instructions represent a possible DTIO sequence. In response to determining that the combined instruction properties of the present instruction and one or more successive instructions indicate that the current instruction and one or more successive instructions represent a possible DTIO sequence (i.e., the properties are compatible), control transfers from block 748 to block 750. In response to determining the DTIO sequence is not a possible DTIO sequence, control transfers from block 748 to block 734. In block 750 group formation unit 206 determines whether the possible DTIO sequence fits entirely within the current instruction group. In response to the DTIO sequence fitting entirely within the current instruction group control transfers from block 750 to block 736. In response to the DTIO sequence not fitting entirely within the current instruction group control transfers from block 750 to block 734.

Those skilled in the art will understand that while process 730 is shown as operating sequentially on each instruction, the illustrated blocks may be reordered and or performed in parallel on a variety of embodiments while processor 102 is powered up. For example, in at least one embodiment, an entire possible DTIO sequence is added to a current instruction group immediately responsive to a determination in block 750 that a possible DTIO sequence will fit in a current group. In at least one embodiment, the entire possible DTIO sequence is immediately added to the next instruction group upon the determination in block 750 that the DTIO sequence does not fit in the current instruction group. In at least one embodiment, the determination in block 748 further includes a determination of whether performing DTIO offers a benefit in accordance with one or more metrics, e.g., including, but not limited to, metrics such as overall performance or power consumption, based on instruction execution feedback, and a sequence that does not offer a benefit is not indicated as a possible DTIO sequence.

Figure 7B:
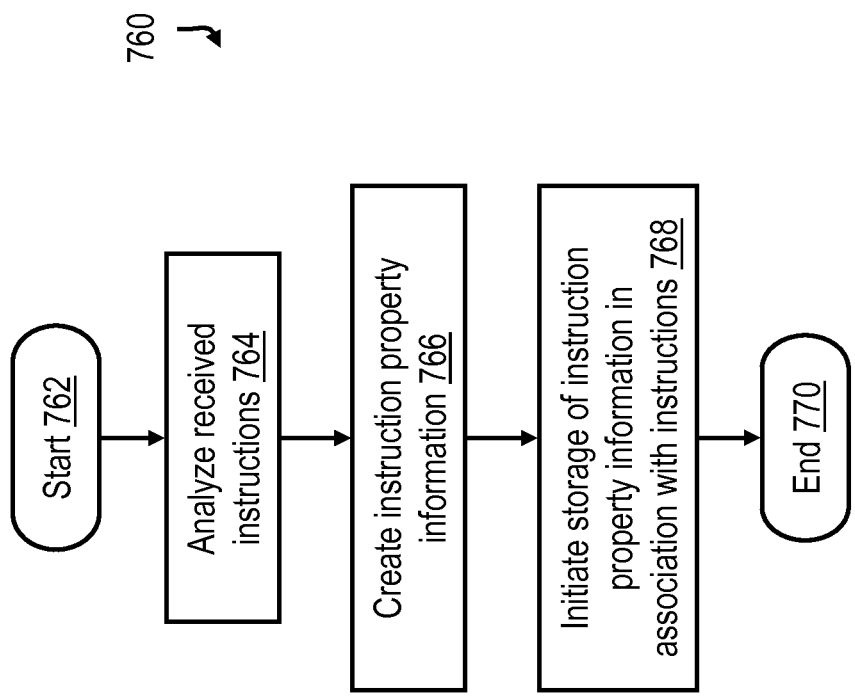
FIG. 7B is a flowchart of an exemplary process for analyzing instructions and creating instruction property information that is implemented by a predecode unit, according to the present disclosure.

With reference to FIG. 7B, an exemplary process 760 is illustrated that is executed by processor 102, for example, each time instructions are received by predecode unit 202. Process 760 is initiated in block 762, at which point control transfers to block 764. In block 764, predecode unit 202 analyzes received instructions. For example, predecode unit 202 may analyze all of the instructions in a cache sector (e.g., thirty-two bytes) or a cache line (e.g., one-hundred twenty-eight bytes). Next, in block 766, predecode unit 202 creates instruction property information for each of the instructions. For example, the created instruction property information (e.g., first and second properties of first and second candidate instructions) may indicate whether each of the instructions is a first candidate instruction or a second candidate instruction for an DTIO candidate sequence. In other embodiments, the instruction property information may also include additional information. In various embodiments, the first and second properties are indicated by fewer instruction bits than is required for a full instruction compare. Then, in block 768, predecode unit 202 initiates storage of the instruction property information in association with the instructions. For example, the instruction property information may be stored in a memory array of cache unit 204 in conjunction with an associated instruction or may be stored in another location in cache unit 204. Next, in block 770, process 760 terminates until a next reload of instructions occurs.

Figure 7C:
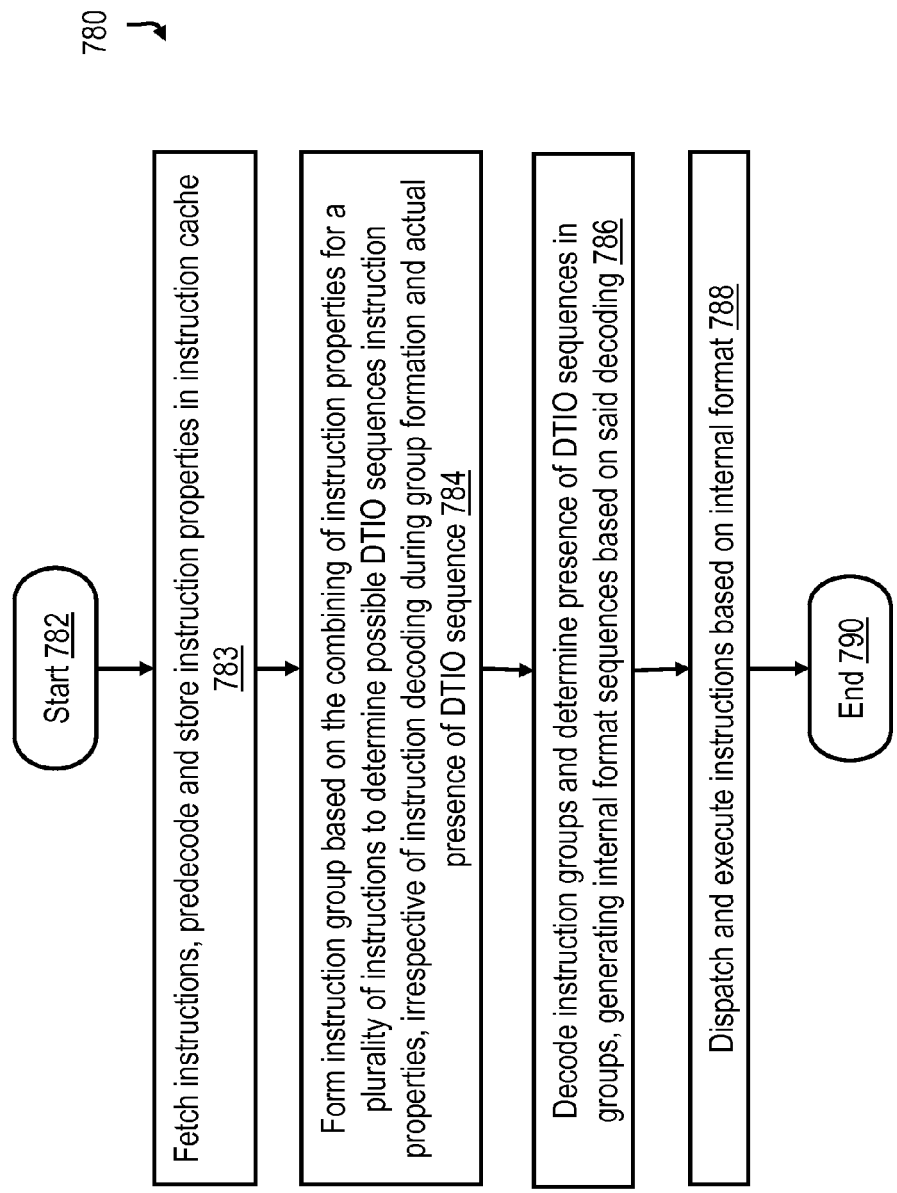
FIG. 7C is a flowchart of an exemplary instruction processing from instruction fetch to execution.

FIG. 7C illustrates an exemplary instruction flow process 780 of one or more instructions in processor 102 based on instruction property-based group formation in conjunction with feedback. Process 780 is initiated in block 782, for example, in response to processor 102 issuing an instruction fetch request. In block 783, a plurality of instructions are fetched and predecoded, including determining instruction properties with respect to the identified instruction being a member of a DTIO sequence, to guide group formation to avoid splitting possible DTIO sequences irrespective of determining the actual presence of DTIO sequences. Advantageously, this reduces the decoding performed during predecode and group formation, while avoiding splitting of possible DTIO sequences without the cost of performing a full decode and determination with respect to the presence of DTIO sequences during group formation. The predecoded information and instruction properties may be stored in cache unit 204.

Next, in block 784, instruction groups are formed from a plurality of instructions to be grouped based on the compatibility of instruction properties for a plurality of instructions to determine the possible presence of DTIO sequences to a design-established (non-zero) likelihood based on the property of a current and one or more next instructions indicating the membership of the first and next instructions in at least one DTIO sequence irrespective of the plurality of instructions actually constituting a DTIO sequence. In at least one embodiment, the instruction properties further encode a position that each DTIO sequence member has in their respective DTIO sequence. In various embodiments, a DTIO sequence is only detected for a DTIO sequence of n instructions if that sequence consists of a first instruction of an identified sequence, sequence class, or sequence class category identified as a first instruction of such sequence by the instruction property, followed by a second instruction of an identified sequence, sequence class, or class category identified as a second instruction of such sequence by the instruction property, sequence class, or sequence class category up to an nth instruction identified as an nth instruction of such sequence of such sequence by the instruction property, sequence class, or sequence class category.

In one embodiment, instructions may only include decode information with respect to their membership and position in any DTIO sequence, identifying them as a first, a second, a third, etc. instruction. In another embodiment, DTIO instruction sequences may be grouped in classes of sequences, adapted to reduce false matches and increase the likelihood of finding true matches and minimize the likelihood of false matches based on assigning multiple DTIO sequences to each class so as to minimize the likelihood of the occurrence of false sequences, based on, for example, statistical code occurrences of instruction combinations, analytical models, or other metrics. In accordance with one aspect, DTIO sequences are combined into sequence classes in a manner to minimize the occurrence of false combinations (i.e., combinatorial instruction sequences made up of instructions of different sequences assigned to a class that does not correspond to an actual DTIO sequence). In yet another embodiment, the class may be further categorized based on additional sequence characteristics, such as dependence-carrying registers (i.e., registers written by one instruction of a sequence and read by another), hashes, or other bit combinations or bit subsequences.

Advantageously, the use of DTIO sequence information enables designers to create predecoded instruction properties that facilitate increasing the probability of basing decisions on the possible presence of DTIO sequences irrespective of the need to fully decode instructions to determine actual presence, optimizing benefit of group "quality" relative to cost of computing and storing predecoded instruction properties, and logic needed to combine the properties to make a determination. In accordance with at least one embodiment, group quality is defined as maximizing the number of instructions in each group while also maintaining actual DTIO sequences within the same group to enable decode logic to perform DTIO. In yet another embodiment, group quality is defined as group organization so as to optimize overall performance. In accordance with at least one such embodiment, group formation further receives feedback with respect to the benefit of group formation to collocate a possible DTIO sequence in a group. In at least one embodiment, when a possible DTIO sequence does not demonstrate an advantageous performance impact, block 784 will not include a possible sequence in the set of possible DTIO sequences considered during group formation.

Next, in block 786, instruction groups are decoded to an internal format. A determination of the presence of one or more DTIO sequences in a group is made and, responsive to the presence of a DTIO sequence, DTIO is performed to transform a first sequence of instructions expressed in a program instruction sequence into an alternate internal format sequence having improved instruction execution characteristics. Then, in block 788, instructions in internal format obtained either by instruction decoding or DTIO are dispatched by ISU 214 and executed by execution units 218. Following block 788, process 780 end in block 790.

In accordance with one exemplary embodiment, where possible DTIO sequences are determined in accordance with classification of an instruction property during predecode is limited to indicating whether an instruction is a possible first instruction and whether an instruction is a possible second instruction of a DTIO sequence. It should be appreciated that if several two-instruction patterns are implemented where not every first instruction of a two instruction pattern can be combined with any second instruction of a two instruction pattern that represents a DTIO sequence false matches may be created because group formation determines possible presence based on predecode information irrespective of actual presence. As one example, patterns may include the following true instruction pairs: ADDIS/LWZ; ADDIS/LD; and EXTSW/SLDI. In this case, the fusion first instruction candidates include the instructions 'ADDIS' and 'EXTSW' and the fusion second instruction candidates include the instructions 'LWZ', 'LD', 'SLDI'. False instruction pairs include: ADDIS/SLDI; EXTSW/LWZ; and EXTSW/LD.

In the above example, false matches can occur fifty percent of the time assuming a uniform distribution of instructions. As one example, the total false groupings may be given by the equation: total_false=(#first*#second)−(#patterns). It should be appreciated that false groupings may be larger than true groupings. Conversely, if falsely identified sequences are rarely expected to appear in real programs, the occurrence of these patterns may be negligible in real execution.

According to one aspect, the success of instruction pairing may be improved by assigning multiple bits to identify different groups of patterns. Either one pattern may be assigned to a bit combination or multiple patterns may be assigned to each bit combinations in a manner that frequently occurring two-instruction sequences that are not DTIO sequences do not have a pattern (e.g., with a first instruction corresponding to a first instruction of a frequently occurring two-instruction sequence assigned to a same bit combination as a pattern with a second instruction corresponding to a second instruction of the frequently occurring non-DTIO two instruction sequence to avoid frequent false matches). For example, an embodiment may implement one bit for a fusion first instruction candidate, one bit for a fusion second instruction candidate, and 'N' bits for a candidate class. It should be appreciated that with 2^N classes, the greater 'N' the more granularity.

As one example, instruction classes using one class bit may be implemented with the following exemplary logic:

```
instruction.candidate_for_1st = FALSE
instruction.candidate_for_2nd = FALSE
IF instruction = ADDIS THEN
    instruction.candidate_for_1st = TRUE
    instruction.class = 0
ELSIF instruction = EXTSW THEN
    instruction.candidate_for_1st = TRUE
    instruction.class = 1
ELSIF instruction = LWZ
OR instruction = LD THEN
    instruction.candidate_for_2nd = TRUE
    instruction.class = 0
ELSIF instruction = SLDI THEN
```

```
            instruction.candidate_for_2nd = TRUE
            instruction.class = 1
        END IF
```

In the above example, the 'ADDIS' instruction is a fusion first instruction candidate assigned to class '0', the 'EXTSW' instruction is a fusion first instruction candidate assigned to class '1', the 'LWZ' and 'LD' instructions are fusion second instruction candidates assigned to class '0', and the 'SLDI' instruction is a fusion second instruction candidate assigned to class '1'. For example, a decision on group formation may be implemented by the following logic (e.g., in accordance with determination 748 of FIG. 7A):

```
IF i0.candidate_for_1st AND i1.candidate_for_2nd AND
i0.class = i1.class THEN
    start new group at i0 to group i0, i1
ELSE
    continue current group formation pattern
```

As another example, an embodiment may implement 'K' bits for a first candidate class (e.g., with two bits '00' corresponding to no candidate) and 'K' bits for a second candidate class. It should be appreciated that for $2^K-1$ classes, granularity increases with 'K'. This encoding also allows an instruction to be a first instruction candidate for one class and a second instruction candidate for another class.

As another example, exemplary logic for implementing instruction classes using two class bits may take the following form:

```
instruction.candidate_for_1st_class = 00
instruction.candidate_for_2nd_class = 00
IF instruction = ADDIS THEN
    instruction.candidate_for_1st_class = 01
ELSIF instruction = EXTSW THEN
    instruction.candidate_for_1st_class = 10
ELSIF instruction = LWZ OR instruction = LD THEN
    instruction.candidate_for_2nd_class = 01
ELSIF instruction = SLDI THEN
    instruction.candidate_for_2nd_class = 10
ELSIF ... <test more instructions, e.g., corresponding to class 11> ...
END IF
```

A decision on group formation may, for example, be implemented by the following exemplary logic:

```
IF i0.candidate_for_1st_class AND i1.candidate_for_2nd_ class AND
i0.candidate_for_1st_class = i1.candidate_for_2nd_ class THEN
    start new group at i0 to group i0, i1
ELSE
    continue current group formation pattern
```

In order for DTIO to be performed successfully, not only does the sequence of instructions need to correspond to an optimizable DTIO sequence, but also the dependence relationship between the instructions must meet certain criteria. Thus, if instruction operands do not meet requirements, DTIO cannot be performed and performance may be degraded by prematurely starting a new group, thereby making less efficient use of instruction dispatch and decode facilities without gaining any advantage by performing DTIO. For example, the instruction 'ADDIS r5, r2, 1' does not fuse with the instruction 'LWZ r6, r6, 0', as the same registers are not utilized. According to another aspect of the present disclosure, register operands are included in matches. In one embodiment, fixed dependence relationships are associated with each pattern group and register specifier tests may be included in a testing of a pattern group.

Thus, for example, one instruction property/characteristic tests may be extended in another embodiment to include register dependence checking. In one exemplary register specifier dependence checking implementation, register dependence checking is implemented as follows:

```
IF i0.candidate_for_1st_class AND i1.candidate_for_2nd_class AND
i0.candidate_for_1st_class = i1.candidate_for_2nd_class AND
i0.rt_specifier = i1.ra_specifier THEN
    start new group at i0 to group i0, i1
ELSE
    continue current group formation pattern
```

In another embodiment, register operands that must be matched may be captured by a register characteristic, e.g., a subset or hash of relevant operand register specifiers may be used in combination with instruction classes to determine a qualifying candidate DTIO sequence that should be combined into a single instruction group. More generally, a register operand may be represented by a code, e.g., represented as code(reg), that may consist of one or more bits. For example, code (reg) may be represented by: the first bit of a register specified, i.e., code(reg)=reg[0]; the first two bits of a register specifier combined with a logic function such as XOR, i.e., code(reg)=reg[0] XOR reg[1]; a plurality of bits, such as the first two bits, of a register specifier, i.e., code (reg)=reg[1:0]; a combination of all bits of a register specifier using several logic gates, e.g., by combining all bits by XOR, i.e., code(reg)=XOR reduce(reg); or computing a hash code from the register specifier, i.e., code(reg)=hash (reg). In general, utilizing more bits improves grouping, albeit at a cost of requiring more storage to store in the instruction cache unit and other structures and more logic to test for a possible sequence match.

For example, exemplary logic for implementing a register predecode to compute a register characteristic 'reg' may take the following form:

```
instruction.candidate_for_1st = FALSE
instruction.candidate_for_2nd = FALSE
IF instruction = ADDIS THEN
    instruction.candidate_for_1st = TRUE
    instruction.reg = code(instruction.rt_specifier)
ELSIF instruction = EXTSW THEN
    instruction.candidate_for_1st = TRUE
    instruction.reg = code(instruction.rt_specifier)
ELSIF instruction = LWZ OR instruction = LD THEN
    instruction.candidate_for_2nd = TRUE
    instruction.reg = code(instruction.ra_specifier)
ELSIF instruction = SLDI THEN
    instruction.candidate_for_2nd = TRUE
    instruction.reg = code(instruction.ra_specifier)
END IF
```

Exemplary logic for group formation using a predecoded register characteristic may take the following form:

```
IF i0.candidate_for_1st AND i1.candidate_for_2nd AND
i0.reg = i1.reg THEN
    start new group at i0 to group i0, i1
ELSE
    continue current group formation pattern
```

Exemplary logic for combining registers and classes may take the following form:

```
instruction.candidate_for_1st = FALSE
instruction.candidate_for_2nd = FALSE
IF instruction = ADDIS THEN
    instruction.candidate_for_1st = TRUE
    instruction.class = 0
    instruction.reg = code(instruction.rt_specifier)
ELSIF instruction = EXTSW THEN
    instruction.candidate_for_1st = TRUE
    instruction.class = 1
    instruction.reg = code(instruction.rt_specifier)
ELSIF instruction = LWZ OR instruction = LD THEN
    instruction.candidate_for_2nd = TRUE
    instruction.class = 0
    instruction.reg = code(instruction.ra_specifier)
ELSIF instruction = SLDI THEN
    instruction.candidate_for_2nd = TRUE
    instruction.class = 1
    instruction.reg = code(instruction.ra_specifier)
END IF
```

Exemplary logic for group formation for considering combinations of instructions that may be candidates for DTIO based on the register 'reg' and class characteristic may take the following form:

```
IF i0.candidate_for_1st AND i1.candidate_for_2nd AND
i0.class = i1.class AND i0.reg = i1.reg THEN
    start new group at i0 to group i0, i1
ELSE
    continue current group formation pattern
```

Instead of having two different codes for registers and classes, the registers and classes can be combined into one characteristic code represented, for example, by codeforall (class, reg). In this case, codeforall(class, reg) may be equal to codeforall(class, reg)=class XOR hash(reg). Exemplary logic for a combined characteristic "code" for registers and classes may take the following form:

```
instruction.candidate_for_1st = FALSE
instruction.candidate_for_2nd = FALSE
IF instruction = ADDIS THEN
instruction.candidate_for_1st = TRUE
    instruction.code = codeforall (0, instruction.rt_specifier)
ELSIF instruction = EXTSW THEN
    instruction.candidate_for_1st = TRUE
    instruction.code = codeforall (1, instruction.rt_specifier)
ELSIF instruction = LWZ OR instruction = LD THEN
    instruction.candidate_for_2nd = TRUE
    instruction.code = codeforall (0, instruction.ra_specifier)
ELSIF instruction = SLDI THEN
    instruction.candidate_for_2nd = TRUE
    instruction.code = codeforall (1, instruction.ra_specifier)
END IF
```

Exemplary logic for group formation for the combined register and class code may take the following form:

```
IF i0.candidate_for_1st AND i1.candidate_for_2nd AND i0.code =
    i1.code THEN start new group at i0 to group i0, i1
ELSE
    continue current group formation pattern
```

In general, class-based instruction pairing can reduce the number of false matches, but cannot completely eliminate false matches when more patterns than classes are implemented. In general, some code sequences may trigger notable degradation and if known such instruction pairings can be avoided during compilation. However, for compiled applications that have been previously developed the code sequences that trigger notable degradation that are already compiled cannot be avoided. According to various aspects of the present disclosure, feedback may be employed to determine cost/benefit for forming groups for DTIO based on instruction classes. Cost/benefit may then be tracked on a variety of criteria. The criteria may be used as a global hardware setting without intervention of supervisory software, such as an operating system (OS), or associated with each layer of software abstraction in a system (e.g., co-routine, thread, process, partition, virtual machine) and saved/restored by context switching code associated with context switching between co-routines, threads, processes, partitions, and virtual machines, respectively. The global setting in hardware may be per partition (optionally context switched), per process (context switched), per thread (software thread context switched or hardware thread without context switch), per class, or per class and thread/process (and context switched or not context switched).

For example, feedback may be used to capture whether a decision to modify group formation was successful and a control decision may be added to group formation using the following exemplary logic:

```
IF i0.candidate_for_1st AND i1.candidate_for_2nd AND
i0.code = i1.code AND (group_formation_benefit) THEN
    start new group at i0 to group i0, i1
ELSE
    continue current group formation pattern
```

Group formation benefit may be determined by implementing a counter that counts whether DTIO group formation prediction based on class was correct. For example, if a formed DTIO group based on class information was beneficial, a counter may be incremented (e.g., counter++). On the other hand, if a formed DTIO group based on class information was not beneficial, the counter may be decremented (e.g., counter --). In general, a benefit may be indicated if the counter is greater than zero or, more generally, if the counter is greater than a threshold value. In accordance with exemplary embodiments, one or multiple counters may be maintained. In accordance with one or more exemplary embodiments, group formation benefit counters may be maintained, for example, for a processor or a hardware thread, may be associated to a specific class or code, or to a specific instruction address. Group formation benefit may be determined using a counter for estimated benefit of group formation based on expected relative cost of starting a new group incorrectly versus fusing (statically defined). If a DTIO group formed based on class information was beneficial a counter for a given DTIO pattern may be incremented. If a DTIO group formed based on class information was not beneficial, a counter that tracks a cost for leaving slots empty may be decremented.

It should be appreciated that the benefit for making right decisions may be asymmetric with the penalty for making wrong decisions. Cost and benefit may be set statically at design time or as configuration parameter, e.g., in configuration registers. Group formation benefit may be based on expected relative cost of starting a new group incorrectly versus the benefit of performing DTIO fusing (statically defined at design time, during a configuration step prior to system or program operation, or dynamically measured at runtime). If missing a DTIO group formation degraded performance, then incrementing a counter indicates there would have been a benefit for DTIO. An instruction may be marked to indicate a missed DTIO opportunity due to a group formation limit (e.g., a true opportunity missed may be checked by tracking instructions across group boundaries during decode). Instructions may be marked to indicate a consuming instruction used the result of a producing instruction immediately (i.e., the result is on a critical path). For example, if any instruction that is marked is next to commit at the moment it finishes, it was on the critical path and a counter indicating a DTIO benefit may be incremented.

As another example, when a selection of an instruction to issue leads to an empty issue slot a determination may be made as to whether missing a group formation degraded performance. Feedback of group formation benefit may be incorporated in predecode bits. For example, if a group was combined because "i0.candidate_for_1st AND i1.candidate_for_2nd AND i0.code=i1.code" or class, or other equivalent condition and a benefit is not realized then 'i0' predecode information and/or 'i1' predecode information may be updated such that the instructions are no longer group candidates. In one exemplary embodiment, this may be performed by updating an instruction candidate characteristic of an instruction, as may be stored in an instruction cache, e.g., 'i0.candidate_for_1st=0' and/or 'i1.candidate_for_2nd=0'. In accordance with one optimized embodiment, updating only one candidate characteristic is sufficient to make a DTIO candidate group a non-candidate, thus reducing the number of instruction characteristics that need to be updated.

As previously described, it is desirable for instruction group formation for DTIO to have a global context to avoid suboptimal group formation. However, global analysis may not be possible due to instruction information being unavailable. Accordingly, group formation decisions may have to be made based on limited information, which may lead to significantly degraded group quality and overall processor performance degradation. In general, predictive instruction group formation may provide suboptimal results when predictions are inaccurate.

Embodiments of the present disclosure combine predictive and decode-based group formation to generate predecode information based on actual instruction decode information, when actual instruction decode information is available. When actual instruction decode information is not available, predictive techniques are employed. In one embodiment, full decoding may be implemented for instructions within a cache segment. In various embodiments, predictive techniques may be employed at cache segment and cache line boundaries. In one or more embodiments, predictive techniques are utilized to initially drive the creation of potential DTIO groups. In at least one embodiment, a decode unit then performs a full decode of instruction groups and updates predecode information based on actual instruction decode and DTIO sequence analysis. While the disclosure focuses on grouping two instructions, the disclosed techniques can be applied to grouping any number of instructions.

In various embodiments, predecode information is generated to facilitate grouping, within an instruction group, instructions that may be jointly optimized (e.g., the fusion of two add instructions that add values to a same register). The predecode information is created based on DTIO sequence eligibility when information is available to fully analyze instructions for DTIO eligibility. The predecode information may be created based on class-based prediction of DTIO sequences when full instruction analysis cannot be performed (e.g., at cache boundaries). According to one or more aspects, predecode/decode group formation for DTIO is split. Instructions are indicated as a first instruction or a second instruction in a DTIO sequence by predecoding. If instructions can be jointly analyzed for DTIO opportunity in predecode, detailed analysis is performed and the instructions may then be grouped if a valid group is indicated. If instructions cannot be jointly analyzed during predecoding, class-based analysis is performed. For example, exemplary logic for class-based analysis of boundary instructions may take the following form:

```
IF i0.candidate_for_1st AND i1.candidate_for_2nd THEN
    start new group at i0 to group i0, i1
ELSE
    continue current group formation pattern
```

In one embodiment, fully analyzed DTIO sequences are indicated by a separate property associated with an instruction (e.g., a match bit for an instruction may be set to indicate a next instruction in an instruction sequence should be grouped with the instruction). In another embodiment, boundary instructions are indicated to be one class of a class-based predictive matching scheme. In yet another embodiment, fully analyzed DTIO sequences may be indicated by one class (or one indicator) of a predictive scheme when that class (indicator) is also used for predictive matching. In another embodiment, class is used to encode a predictive sequence for isolated analysis. Exemplary logic for implementing predecoding may take the following form:

```
instruction.known_match = FALSE
instruction.candidate_for_1st = FALSE
instruction.candidate_for_2nd = FALSE
IF instruction = ADDIS THEN
    instruction.candidate_for_1st = TRUE
    IF (next_instruction == LWZ AND
    next_instruction.rs1_specifier =instruction.rt_specfier
    AND next_instruction.rt_specifier = next_instruction.rs1_specifier)
        instruction.known_match = TRUE
ELSIF instruction = LWZ OR instruction = LD THEN
    --no need to test first instruction because pattern for first already
    performed exhaustive
    test
    instruction.candidate_for_2nd = TRUE
END IF
```

In the above logic, when the 'ADDIS' and 'LWZ' instructions are utilizing the same target registers, and the first source register of the load ('LWZ' or 'LD') instruction matches that target, then displacement fusion is possible and the 'ADDIS' and 'LWZ' instructions should be grouped in a same instruction decode group. If both instructions are in the same cache sector, subline, cache line, or other predecode group, these properties may be fully checked during predecode, and a fully analyzed DTIO candidate sequence may be marked as such, e.g., with an exemplary 'instruction.known_match=TRUE'. When the 'ADDIS' instruction is the last instruction before a cache boundary, the 'ADDIS' instruction is marked as a first instruction candidate ('instruction.candidate_for_1st=TRUE'). When an 'LWZ' or 'LD' instruction is not a first instruction after a cache boundary, no separate distinct testing is performed from the candidate sequence analysis testing shown in conjunction with the 'ADDIS' instruction. In at least one embodiment, the testing shown in conjunction with the 'ADDIS' instruction may be performed in conjunction with an 'LWZ' or 'LD' instruction. When an 'LWZ' instruction or an 'LD' instruction is the first instruction encountered following the cache boundary, the instruction is marked as a second instruction of a DTIO sequence candidate.

Exemplary logic for implementing predecoding using a shared indicator for known candidate sequences and predictive candidate sequence may take the following form with predicted and known sequences encoded using the 'instruction.candidate_for_1$^{st}$' and 'instruction.candidate_for_2$^{nd}$' property to detect either a first known or second predicted sequence:

```
instruction.candidate_for_1st = FALSE
instruction.candidate_for_2nd = FALSE
IF instruction = ADDIS THEN
    IF (NOT next_instruction_available OR
        ((next_instruction = LWZ or next_instruction = LD) AND
            next_instruction.rs1_specifier = instruction.rt_specifier
            AND
            next_instruction.rt_specifier =
            next_instruction.rs1_specifier))
        instruction.candidate_for_1st = TRUE
    ELSE
        instruction.candidate_for_1st = FALSE
ELSIF instruction = LWZ OR instruction = LD THEN
    --no need to test first instruction because pattern for first already
    performed exhaustive
    test
    instruction.candidate_for_2nd = TRUE
END IF
```

In the above logic, if a next instruction is not available (i.e., the 'ADDIS' instruction is the last instruction before a cache boundary) or when the 'ADDIS' and one of a subsequent 'LWZ' or 'LD' instructions are utilizing the same registers and 'LWZ' or 'LD' is the next instruction, the instruction corresponding to the 'ADDIS' instruction is marked as a first instruction candidate (instruction.candidate_for_1st=TRUE), and the 'LWZ' or 'LD' instruction is later marked as a second instruction candidate (instruction.candidate_for_2nd=TRUE). In accordance with this exemplary embodiment, when both a first 'ADDIS' and a second load ('LWZ' or 'LD') instruction is available, the instruction corresponding to the 'ADDIS' instruction is only marked as a candidate when the DTIO sequence meets all requirements for a DTIO candidate and the instruction is otherwise marked as not being a candidate, causing a subsequent test (e.g., block 748 of FIG. 7A) to fail and indicate the absence of a sequence.

Exemplary logic for implementing predecode using a shared indicator with partial co-analysis may take the following form:

```
instruction.candidate_for_1st = FALSE
instruction.candidate_for_2nd = FALSE
IF instruction = ADDIS THEN
    IF (NOT next_instruction_available OR
            next_instruction = LWZ OR next_instruction = LD)
        instruction.candidate_for_1st = TRUE
    ELSE
        instruction.candidate_for_1st = FALSE
ELSIF instruction = LWZ OR instruction = LD THEN
        instruction.candidate_for_2nd = TRUE
END IF
```

Logic for instruction group formation using two bits for a class may take the following form:

```
instruction.candidate_for_1st_class = 00
instruction.candidate_for_2nd_class = 00
IF instruction = ADDIS THEN
    IF (NOT next_instruction_available OR
        ((next_instruction = LWZ AND next_instruction = LD) AND
        next_instruction.rs1_specifier = instruction.rt_specifier AND
        next_instruction.rt_specifier =
        next_instruction.rs1_specifier)
        instruction.candidate_for_1st class = 01
ELSIF instruction = EXTSW THEN
    IF (NOT next_instruction_available OR
        (next_instruction = SLDI AND
        next_instruction.rs1_specifier =
        instruction.rt_specifier AND next_instruction.rt_specifier =
        next_instruction.rs1_specifier)
        instruction.candidate_for_1st class = 10
ELSIF instruction = LWZ OR instruction = LD THEN
        instruction.candidate_for_2nd class = 01
ELSIF instruction = SLDI THEN
        instruction.candidate_for_2nd class = 10
ELSIF ... <test for more DTIO candidate sequences, e.g., using class 11 to encode>
END IF
```

Logic for group formation may take the following form:

```
IF i0.candidate_for_1st_class AND i1.candidate_for_2nd_class AND
i0.candidate_for_1st_class = i1.candidate_for_2nd class THEN
    start new group at i0 to group i0, i1
ELSE
    continue current group formation pattern
```

The above-described boundary approach may be practiced in conjunction with virtually any other approach. For example, the above-described boundary approach may be implemented in conjunction with feedback. As one example, feedback of group formation success into predecode bits may take the following form:

```
IF group was combined because (i0.candidate_for_1st AND
i1.candidate_for_2nd AND i0.code = i1.code; or due to class match, or
another equivalent condition in accordance with the teachings herein)
THEN
IF decode determines that DTIO cannot be performed
    update DTIO candidate characteristic property stored corresponding
    to instructions i0 and/or i1 to no longer identify at least one of i0
    and/or i1 as a candidate, e.g., i0.candidate_for_1st =0 and
    i1.candidate_for_2nd =0.
```

Figure 8:
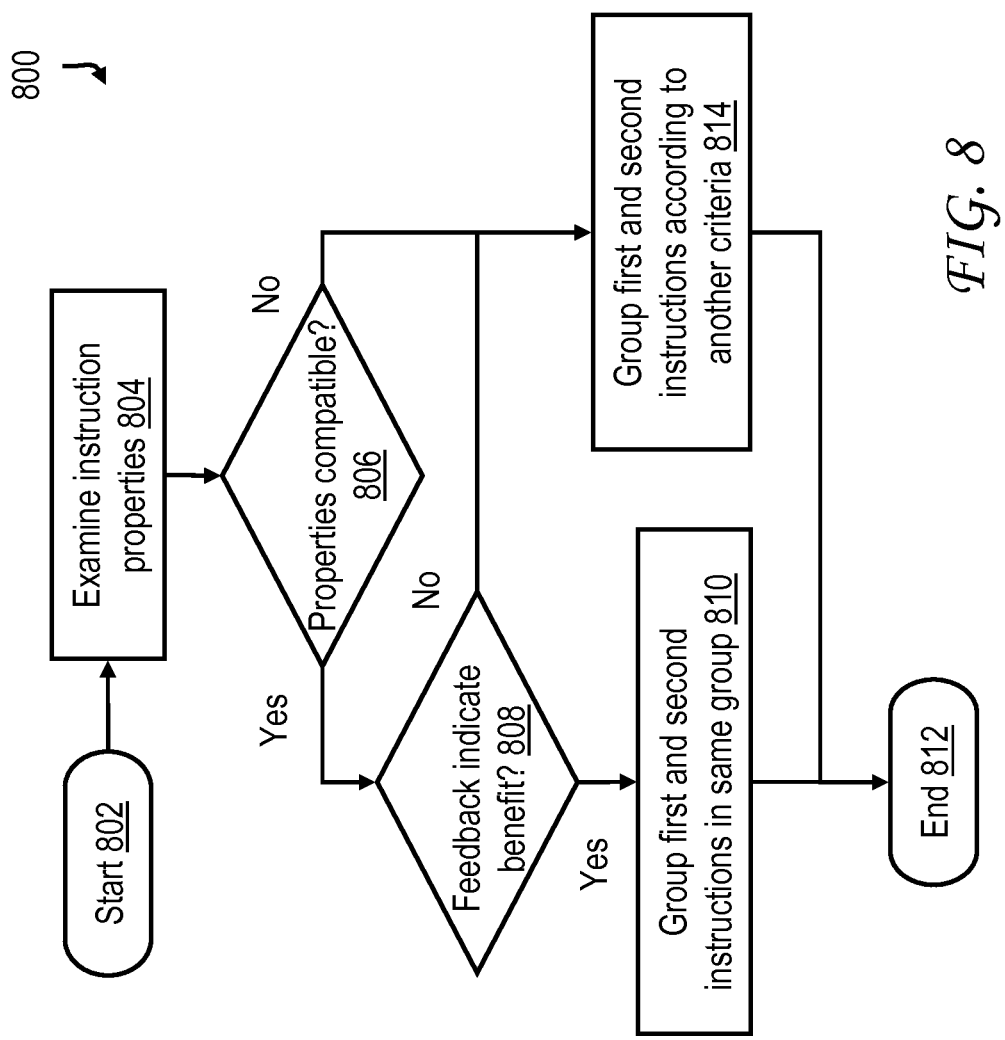
FIG. 8 is a flowchart of an exemplary process for forming instruction groups for DTIO based on feedback that is implemented by a group formation unit, according to the present disclosure.

With reference to FIG. 8, an exemplary process 800 is illustrated that is executed by processor 102, for example, each time group formation unit 206 selects instructions from cache unit 204 for grouping. Process 800 is initiated in block 802, at which point control transfers to block 804. In block 804 group formation unit 206 examines instruction properties. For example, group formation unit 206 may examine a first property of a first instruction and a second property of a second instruction. Next, in decision block 806, group formation unit 206 determines whether the properties for the first and second instructions are compatible. For example, group formation unit 206 may determine one instruction is a first instruction candidate for a decode-time optimization sequence and a subsequent instruction is a second instruction candidate for a decode-time optimization sequence.

In response to the properties for the first and second instructions not being compatible in block 806, control transfers to block 814. In block 814, group formation unit 206 performs group formation according to another criteria (e.g., to maximize the size of groups or minimize the number of groups). Then, control transfers from block 814 to block 812, where process 800 terminates until additional instructions are selected from cache unit 204 for grouping. In response to the properties for the first and second instructions being compatible in block 806, control transfers to decision block 808. In block 808, group formation unit 206 determines whether feedback (provided by decode unit 208) indicates whether grouping the first and second instructions of the DTIO candidate sequence in an instruction group has been historically (i.e., during previous executions of this sequence) beneficial with respect to a benefit metric (e.g., improving performance) of processor 102. In response to the feedback indicating the instruction grouping has not been historically beneficial, control transfers from block 808 to block 814. In response to the feedback indicating the instruction grouping has been historically beneficial, control transfers from block 808 to block 810. In block 810, group formation unit 206 groups the first instruction and the second instruction in an instruction group. From block 810 control transfers to block 812.

In accordance to one embodiment, when no feedback information is available to determine a benefit in accordance with prior executions of a first and second instruction as a DTIO sequence, control may pass from block 808 to block 810. In accordance with one such embodiment, measuring the benefit derived from performing DTIO is automatically initiated for a sequence not having such benefit information. In another embodiment, benefit information is measured continuously for instructions having been optimized by DTIO. In yet another embodiment, control may transfer from block 808 to yet another block that initiates benefit measurement for the subject sequence prior to creating a group that includes the subject first and second instructions. In yet other embodiments, measurement of a benefit, e.g., a performance benefit, may be performed when DTIO is not performed by determining whether instructions that are candidates for decode-time optimizations are on a critical path when the benefit metric is performance (e.g., as expressed in aggregate instruction latency).

In accordance with one embodiment, benefit corresponds to performance, e.g., the number of execution cycles saved (or wasted) by performing DTIO. In another embodiment, benefit corresponds to power dissipation or energy usage, e.g., the number of Watts or Joules saved (or wasted) by performing DTIO. In yet other embodiments, other measurements, such as peak voltage swings, an aggregate benefit, e.g., power/performance composite metrics, such as an energy-delay product, may be measured. In at least one embodiment, the benefit metric may be selectable via a configuration setting and the configuration setting may be set responsive to environment characteristics (e.g., running on battery or running connected to a power source) and/or configuration settings (optimizing for high performance, low power consumption, balancing both metrics, and so forth).

In yet another embodiment, where instructions are identified as candidates for DTIO speculatively and without fully decoding instruction characteristics to determine whether instructions are in fact compatible, benefit information may be based on a determination of DTIO being successfully performed by decode logic adapted to perform DTIO.

A variety of techniques can be used to measure benefits. In accordance with one embodiment, a processor may initially perform the same sequence twice (with and without performing DTIO) and measure the latency, power, voltage swing, energy-delay product, or other metric associated with both executions and directly compare the metric to determine a preferable execution sequence. To avoid the cost of double execution, a processor may also randomly decide to perform (or not perform) DTIO during the first few executions, and compare an average (or aggregate, or other metric summarizing multiple such executions) of the randomly selected one way of execution (e.g., using DTIO) of such sequence to the average (or aggregate, or other metric summarizing multiple such executions) of the randomly selected another way of execution (e.g., without using DTIO) of such sequence to determine the more beneficial execution sequence. In yet another embodiment, performance monitoring counters may be sampled, to determine the impact of performing DTIO on various characteristics, e.g., average instruction latency, power dissipation, or another metric.

In one embodiment, when candidate instructions that are combinable using DTIO are not combined the candidate instructions are marked for tracking. When a tracked instruction appears in the critical path (e.g., being a marked instruction that is a next to completed instruction in an out-of-order processor) the fact is used as an indicator that DTIO is beneficial for performance. Similarly, other metrics may be derived by determining whether a marked instruction causes excessive power consumption or voltage swings, and so forth.

Accordingly, techniques have been disclosed herein that advantageously group instructions for decode-time instruction optimization.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of processing instructions for execution by a processor, comprising:
   determining, using grouping logic, whether a first property of a first instruction and a second property of a second instruction in an instruction stream are compatible, wherein the first instruction is a last instruction before a cache boundary and the second instruction is an initial instruction after the cache boundary;
   grouping, using the grouping logic, the first instruction and the second instruction in a same decode-time instruction optimization group in response to the first and second properties being compatible and a feedback value generated by a feedback function indicating the same decode-time instruction optimization group has been historically beneficial with respect to a benefit metric of the processor; and
   group, using the grouping logic, the first and second instructions in different decode-time instruction optimization groups, in response to the first and second properties being compatible and the feedback value indicating the grouping of the first and second instructions in the same decode-time instruction optimization group has not been historically beneficial.

2. The method of claim 1, wherein the first and second properties are indicated by fewer instruction bits than is required for a full instruction compare.

3. The method of claim 1, wherein the first and second instructions are grouped in the different decode-time instruction optimization groups to maximize a number of instructions in instruction groups or minimize a number of instruction groups.

4. The method of claim 1, wherein the first and second properties are associated with instruction classes.

5. The method of claim 1, wherein the benefit metric corresponds to performance.

6. The method of claim 1, wherein the benefit metric corresponds to one of reduced power dissipation, reduced energy consumption, reduced voltage swing, and reduced energy-delay.

7. The method of claim 1, wherein the first and second properties are associated with instruction registers.

8. The method of claim 1, wherein the first and second properties are associated with instruction registers and instruction classes.

9. The method of claim 1, further comprising:
   performing decode-time instruction optimization (DTIO) in response to the first and second instructions having compatible properties; and
   refraining from performing DTIO in response to the first and second instructions not having compatible properties.

10. The method of claim 9, further comprising:
    collecting information on DTIO effectiveness; and
    applying the feedback function to the collected information to generate the feedback value.

11. The method of claim 1, further comprising:
    associating the feedback function with one of a hardware core, a hardware thread, a software context, a software process, or a software thread.

12. The method of claim 11, further comprising:
    in response to a context switch for a thread, process and/or partition, initializing the feedback value.

* * * * *